(12) United States Patent
Bagherinia

(10) Patent No.: US 12,555,240 B2
(45) Date of Patent: Feb. 17, 2026

(54) BRUCH'S MEMBRANE SEGMENTATION IN OCT VOLUME

(71) Applicants: Carl Zeiss Meditec, Inc., Dublin, CA (US); Carl Zeiss Meditec AG, Jena (DE)

(72) Inventor: Homayoun Bagherinia, Oakland, CA (US)

(73) Assignees: Carl Zeiss Meditec, Inc., Dublin, CA (US); Carl Zeiss Meditec AG, Jena (DE)

( * ) Notice: Subject to any disclaimer, the term of this patent is extended or adjusted under 35 U.S.C. 154(b) by 420 days.

(21) Appl. No.: 17/916,982

(22) PCT Filed: Apr. 28, 2021

(86) PCT No.: PCT/EP2021/061149
§ 371 (c)(1),
(2) Date: Oct. 4, 2022

(87) PCT Pub. No.: WO2021/219729
PCT Pub. Date: Nov. 4, 2021

(65) Prior Publication Data
US 2023/0162366 A1    May 25, 2023

Related U.S. Application Data

(60) Provisional application No. 63/018,482, filed on Apr. 30, 2020.

(51) Int. Cl.
| | | |
|---|---|---|
| G06T 7/11 | (2017.01) | |
| A61B 3/10 | (2006.01) | |
| A61B 3/12 | (2006.01) | |

(52) U.S. Cl.
CPC ............... G06T 7/11 (2017.01); A61B 3/102 (2013.01); A61B 3/1233 (2013.01); *G06T 2207/10101* (2013.01); *G06T 2207/30041* (2013.01)

(58) Field of Classification Search
CPC ............ G06T 7/11; G06T 2207/10101; G06T 2207/30041; G06T 7/162; G06T 7/12;
(Continued)

(56) References Cited

U.S. PATENT DOCUMENTS

| | | | |
|---|---|---|---|
| 2016/0183786 A1 | 6/2016 | Wei et al. | |
| 2016/0227999 A1* | 8/2016 | An | ........................ G06T 7/0014 |

(Continued)

FOREIGN PATENT DOCUMENTS

| | | |
|---|---|---|
| CN | 102469936 | 10/2014 |
| CN | 106600614 | 4/2017 |

(Continued)

OTHER PUBLICATIONS

Gao et al. "Active Appearance Model based Automated Segmentation of Retinal Layers for Optic Nerve Head Centered OCT Images" published 2017 (Year: 2017).*
(Continued)

*Primary Examiner* — Ming Y Hon
(74) *Attorney, Agent, or Firm* — SNELL & WILMER L.L.P.

(57) ABSTRACT

Retinal layer segmentation in optical coherence tomography (OCT) data is improved by using OCT angiography (OCTA) data to enhance a target retinal layer within the OCT data that may lack sufficient definition for segmentation. The OCT data is enhanced based on a mixture of the OCT data and OCTA data, such that contrast in the OCT data is enhanced in areas where OCT and OCTA data are dissimilar, and is reduced in areas where the OCT and OCTA data are
(Continued)

similar. The target retinal layer in the OCT data is segmented based on the enhanced data. Two en face images of the OCTA data that include the target retinal layer are used to check for errors in the segmentation of the target retinal layer in the OCT data. Identified errors are replaced with an approximation based on the locations of top and bottom retinal layers of one of the en face images.

31 Claims, 17 Drawing Sheets

(58) Field of Classification Search
CPC ....... G06T 7/174; G06T 7/0012; A61B 3/102; A61B 3/1233
See application file for complete search history.

(56) References Cited

U.S. PATENT DOCUMENTS

| | | | |
|---|---|---|---|
| 2017/0119242 A1* | 5/2017 | Jia | A61B 3/1005 |
| 2017/0238877 A1* | 8/2017 | Hsiao | G06V 10/774 |
| 2018/0317851 A1* | 11/2018 | Jia | A61B 5/0066 |

FOREIGN PATENT DOCUMENTS

| | | |
|---|---|---|
| CN | 107788950 | 3/2018 |
| CN | 110415216 | 11/2019 |
| JP | 2019-201718 | 11/2019 |
| WO | 2016109750 | 7/2016 |

OTHER PUBLICATIONS

JPO, Notice of Reasons for Refusal dated Dec. 24, 2024 in JP Serial No. 2022566168.
Chinese Patent Office, Chinese Search Report dated Aug. 12, 2025 in Application No. 2021800275816.
Chinese Patent Office, Chinese Office Action dated Aug. 12, 2025 in Application No. 2021800275816.

* cited by examiner

| FOV [mm²] (# A-scans) | # B-scans (# eyes) | Mean (95%) Abs. Difference Readers [μm] | Mean (95%) Abs. Difference BM-Reader 1 [μm] | Mean (95%) Abs. Difference BM-Reader 2 [μm] | Mean (95%) Abs. Difference BM-Avg. Reader [μm] | R² Reader 1 and 2 | R² BM-Reader 1 | R² BM-Reader 2 | R² BM-Avg. Reader |
|---|---|---|---|---|---|---|---|---|---|
| 3x3 (300x300) | 24 (8) | 0 (+/-0) | 0.13 (+/-0.48) | 0.14 (+/-0.46) | 0.14 (+/-0.48) | 1 | 1 | 1 | 1 |
| 6x6 (500x500) | 27 (9) | 0.04 (+/-2.14) | 0.15 (+/-0.41) | 0.19 (+/-2.16) | 0.17 (+/-1.13) | 0.99 | 1 | 0.99 | 1 |
| 9x9 (500x500) | 27 (9) | 0.02 (+/-0.83) | 0.49 (+/-3.67) | 0.51 (+/-3.75) | 0.50 (+/-3.69) | 1 | 0.99 | 0.99 | 0.99 |
| 12x12 (500x500) | 27 (9) | 0.59 (+/-11.87) | 1.29 (+/-17.04) | 1.36 (+/-19.97) | 1.30 (+/-17.58) | 0.99 | 0.99 | 0.99 | 0.99 |
| 15x9 (834x500) | 15 (5) | 0 (+/-0) | 0.69 (+/-5.14) | 0.69 (+/-5.14) | 0.69 (+/-5.14) | 1 | 0.99 | 0.99 | 0.99 |

FIG. 6

| Sector | R-squared (Slope, intercept) | Mean difference [microns] | 95% lower and higher limits (+/- 1.96 SD) [microns] |
| --- | --- | --- | --- |
| Central (C) | 0.98 (1.07,-15.7) | 8.4 | -25 , 41 |
| Inner Nasal (IN) | 0.95 (1.00,11.8) | 12 | -25 , 49 |
| Inner Superior (IS) | 0.97 (1.04,-3.09) | 9.7 | -24 , 43 |
| Inner Temporal (IT) | 0.97 (1.01,1.76) | 5.4 | -23 , 34 |
| Inner Inferior (II) | 0.98 (1.06,-6.38) | 11 | -17 , 38 |
| Outer Nasal (ON) | 0.94 (0.97,22.7) | 16 | -14 , 46 |
| Outer Superior (OS) | 0.98 (1.02,7.17) | 12 | -12 , 36 |
| Outer Temporal (OT) | 0.98 (0.96,17.1) | 6.6 | -13 , 36 |
| Outer Inferior (OI) | 0.98 (1.05,1.55) | 12 | -8.3 , 32 |

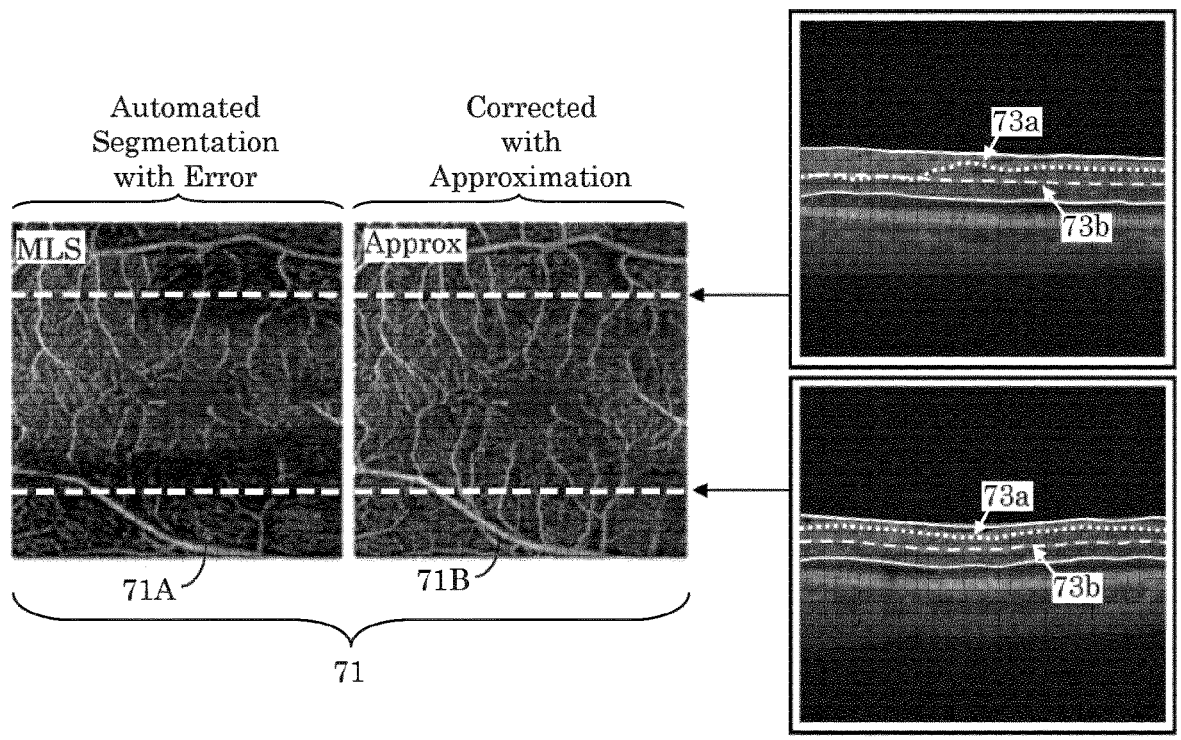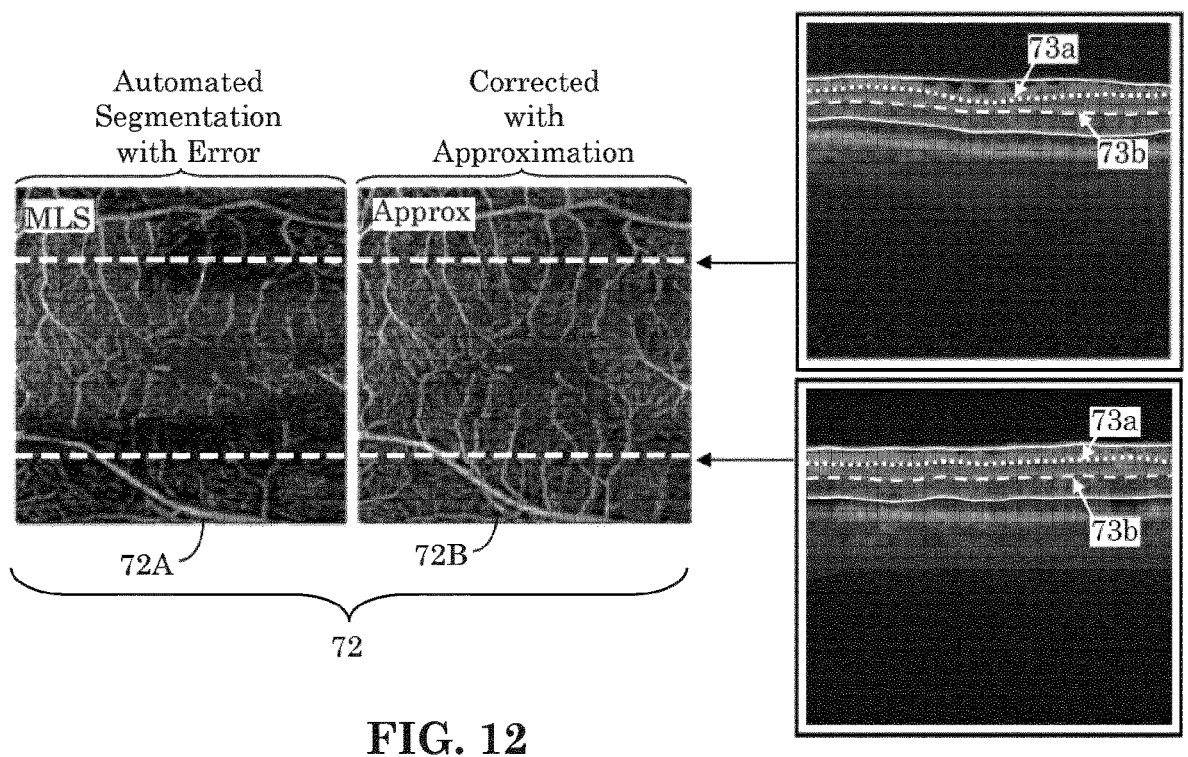
FIG. 12

FIG. 19

Layr1: Inner Limiting Membrane (ILM)
Layr2: (Retinal) Nerve Fiber Layer (RNFL or NFL)
Layr3: Ganglion Cell Layer (GCL)
Layr4: Inner Plexiform Layer (IPL)
Layr5: Inner Nuclear Layer (INL)
Layr6: Outer Plexiform Layer (OPL)
Layr7: Outer Nuclear Layer (ONL)
Layr8: Junction between Outer Segments (OS) and Inner Segments (IS)
Layr9: Externa/Outer Limiting Membrane (ELM/OLM)
Layr10: Retinal Pigment Epithelium (RPE)
Layr11: Bruch's Membrane (BM)

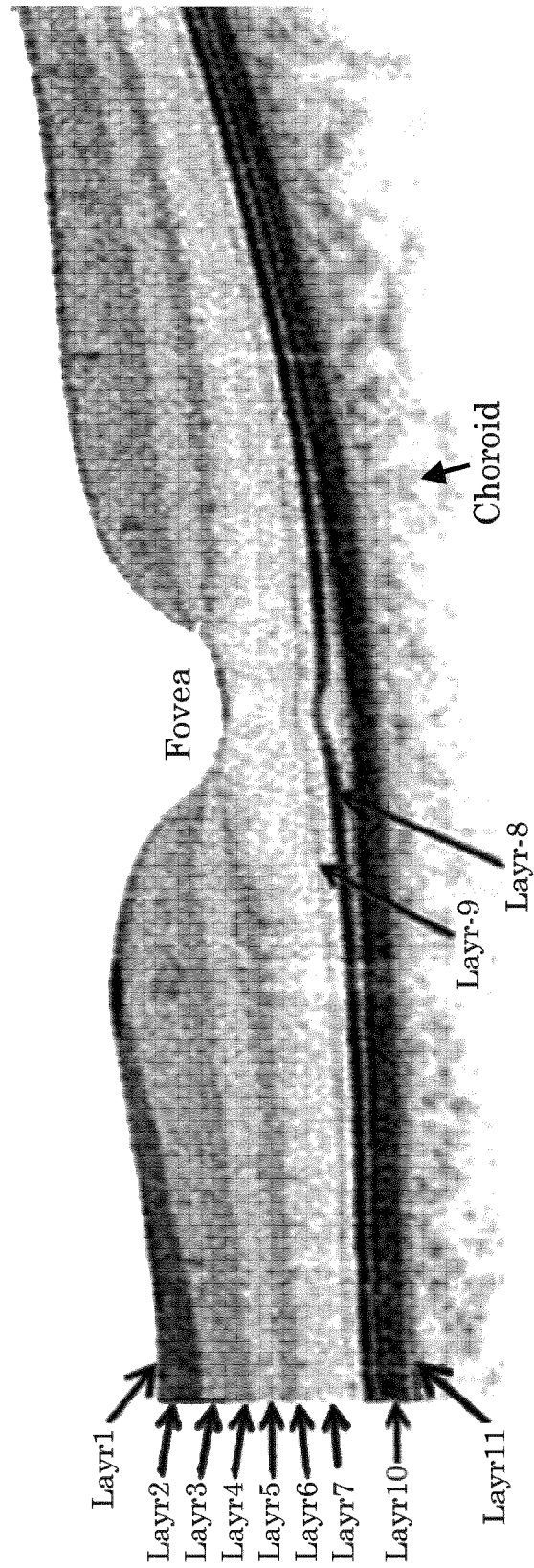

BRUCH'S MEMBRANE SEGMENTATION IN OCT VOLUME

PRIORITY

This application is a National Phase application under 35 U.S.C. § 371 of International Application No. PCT/EP2021/061149, filed Apr. 28, 2021, which claims priority to U.S. Provisional Application Ser. No. 63/018,482, filed Apr. 30, 2020, the contents of which are hereby incorporated by reference in their entirety.

FIELD OF INVENTION

The present invention is generally directed to automated retinal layer segmentation in OCT data. More specifically, it is directed to segmenting retinal layers that may lack definition in OCT data for traditional automated segmentation methods, such as the Bruch's membrane and the choroidal-scleral interface, and to a method for automatically identifying and correcting errors in retinal layer segmentations.

BACKGROUND

OCT is a non-invasive imaging technique that uses light waves to produce cross-section images of retinal tissue. For example, OCT permits one to view the distinctive tissue layers of the retina. Generally, an OCT system is an interferometric imaging system that determines a scattering profile of a sample along an OCT beam by detecting the interference of light reflected from a sample and a reference beam creating a three-dimensional (3D) representation of the sample. Each scattering profile in the depth direction (e.g., z-axis or axial direction) may be reconstructed individually into an axial scan, or A-scan. Cross-sectional, two-dimensional (2D) images (B-scans), and by extension 3D volumes (C-scans or cube scans), may be built up from multiple A-scans acquired as the OCT beam is scanned/moved through a set of transverse (e.g., x-axis and y-axis) locations on the sample. OCT also permits construction of a planar, frontal view (e.g., en face) 2D image of a select portion of a tissue volume (e.g., a target tissue slab (sub-volume) or target tissue layer(s) of the retina). OCT angiography (OCTA) is an extension of OCT, and it may identify (e.g., renders in image format) the presence, or lack, of blood flow in a tissue layer. OCTA may identify blood flow by identifying differences over time (e.g., contrast differences) in multiple OCT images of the same retinal region, and designating differences that meet predefined criteria as blood flow. A more in-depth discussion of OCT and OCTA is provided below.

Often, it is beneficial for diagnosis purposes to identify retinal layers within OCT data in order to better view specific tissues. Having retinal layers identified in OCT data permits one to center in on specific portions of a B-scan or to better define an en face image based on select retinal layers. Manual segmentation of retinal layers is very time-consuming, and can be inconsistent. Thus automated retinal layer segmentation tools are important for segmentation of retinal layers in OCT data, but the reliability of such tools suffers with diminishing quality of the OCT data and/or with the appearance of pathologies that may alter the typical (e.g., expected) shape of retinal layers. Thus, the performance of multilayer segmentation methods/tools becomes an important determinant when evaluating such tools, especially when structure-altering retinal lesions (such as caused by various retinal diseases) are present.

Ideally, automated multilayer segmentation methods determine the desired layer boundaries with no human interaction. However, they are prone to layer misidentification errors, especially in eyes with intermediate to severe retinal lesions, and in OCT data of poor quality. The layer boundaries for these cases are usually not identifiable automatically, or even manually. Layer misidentification can be confounded by OCT imaging errors such as weak signal quality, eye movement, and decentration, but are mostly caused by the morphological complexity and reflectivity changes of retinal structures in disease cases. Accurate multilayer segmentation of these cases is beyond the capability of traditional segmentation algorithms.

Manual multilayer segmentation by human graders usually requires the grader to identify the layers either by free-hand drawing or by placing points to be used for an interpolation or fitting algorithm. The manual methods are time consuming, labor-intensive, and have higher intergrader variability than automated methods. Sometimes manual segmentation is impossible due to loss of retinal layer or boundary.

The difficulty of automated retinal layer segmentation is particularly acute when attempting to segment retinal layers that are typically not well-defined in OCT data (e.g., structural data), such as the Bruch's membrane (BM) or choriocapillaris layer. The choriocapillaris layer is extremely thin, and it is generally helpful to create an en face image to visualize 3D OCTA data in order to resolve choriocapillaris features. Segmentation of the Retinal Pigment Epithelium (RPE) in cases of age-related macular degeneration (AMD) with drusen (deposits of fatty proteins (lipids) that accumulate under the retina) or pigment epithelial detachment (PED) can generally not be used to generate choriocapillaris en face images. Therefore, accurate BM segmentation can be key to resolving choriocapillaris features. Unfortunately, segmentation of the BM can be a difficult due to following reasons: structural OCT data typically has low contrast in the region of the BM, decorrelation tail issues in OCTA data at the RPE and BM, and/or distorted signal around the BM in pathology cases. Combining OCT structural data and OCT flow data to identify the BM is suggested in Schottenhamml et al., "OCT-OCTA segmentation: a novel framework and an application to segment Bruch's membrane in the presence of drusen", *Invest Ophthal Vis Sci.*, 2017; 58(8): 645-645. Although details of their approach are not readily apparent, Schottenhamml et al. appear to use an automatic OCT-OCTA graph-cut algorithm for segmentation of the Bruch's membrane in the presence of drusen.

It is an object of the present invention to provide an automated method/system for providing more reliable segmentation of previously difficult to segment retinal layers, such as the Bruch's membrane and the choriocapillaris.

It is another object of the present invention to provide an automated method/system for retinal layer segmentation in the presence of pathologies.

It is a further object of the present invention to provide an automated method/system to identify errors in a retinal layer segmentation.

It is still another object of the present invention to provide an automated method/system to replace errors in a retinal layer segmentation with an approximation.

SUMMARY OF INVENTION

The above objects are met in a method/system for automated segmentation of the Bruch's Membrane (BM), and other retinal layers, in optical coherence tomography (OCT) data.

OCT structural data is fundamentally different from OCTA flow data due to both providing different types of information. Consequently, their respective images can be quite different, particularly in the upper retinal layers where OCT typically provides good structural information. In these upper layers, the OCT and OCTA data may be quite different. OCT data generally loses definition at lower retinal layers. However, Applicants observed that at these lower retinal layers, OCT data may look similar to OCTA data. The present invention takes advantage of this observation to better emphasize/demarcate the transition from when OCT data differs much from OCTA data to where OCT data becomes more similar to OCTA data. In particular, the choroid and scleral regions are similar in structural OCT and flow OCTA images. By noting where the OCT data is similar to corresponding OCTA data within a slab, choroid and scleral regions may be removed or attenuated from (or otherwise defined/delineated within) structural OCT (using the corresponding OCTA data). In this approach, the structural OCT data around the Bruch's Membrane can be enhanced after the choroid region attenuation. The enhanced OCT data thus makes the segmentation problem much simpler. Although this approach is particularly beneficial at lower retinal layers, it may also be applied to other target retinal layers.

The present invention improves retinal layer segmentation in OCT data by using OCTA data to enhance a target retinal layer (e.g., BM, choroidal-scleral interface, etc.), or region around the target retinal layer, within the OCT data that may otherwise lack sufficient definition for segmentation. The OCT data may be enhanced based on a mixture of the OCT data and OCTA data. In one example, contrast in the OCT data may be enhanced in areas where OCT and OCTA data are dissimilar (e.g., above the target retinal layer), and may be reduced in areas where the OCT and OCTA data are similar (e.g., below the target retinal layer). In another example, contrast in the OCT data may be enhanced around a retinal layer of interest (e.g. Bruch's membrane) by taking advantage of OCT and OCTA similarity and dissimilarity. Enhancing the OCT data may include subtracting from the OCT data a proportion of a (e.g., weighted) mixture of the OCT data and OCTA data, where the proportion may be based on a ratio of a measure of the joint variability (e.g., statistical covariance) of the OCT data and OCTA data to a measure of data spread (e.g., statistical variance) of the OCT data and OCTA data. The enhanced OCT data may thus enhance a demarcation of the target retina layer. The target retinal layer in the OCT data may then be segmented based on the enhanced data. Other layers may then be segmented relative to the target retinal layer.

Although the present invention provides for improved automated retinal segmentation, any segmentation method is prone to error. Therefore, the present invention further provides for automated segmentation error detection and correction or approximation. That is, the present invention provides a method to identify and replace segmentation failures of retinal layers with segmentation approximations. In a particular embodiment, segmentation failure in OCT structural data is automatically identified using angiography (OCTA) retinal layer slabs (e.g., OCTA en face images). Two en face images of the OCTA data that include a target retinal layer (that is to be checked for failure) are used to check for errors in the segmentation of the target retinal layer in the OCT data. For example, the target retinal layer may be the Inner Plexiform Layer (IPL), the Outer Plexiform Layer (OPL), etc. Alternatively, the first and second en face images may be defined from respective slabs from the OCT data.

Determination of a failed or successful segmentation of the target retinal layer is based on a local, or global, similarity measure of first and second en face images. For example, the similarity measure may be based on normalized cross correlation (NCC) between the two en face images. Identified local, or global, errors may be automatically replaced with an approximation based on the locations of top and bottom retinal layers of one of the two en face images. For example, a the target retinal layer may be sandwiched between the top and bottom layers of the slab that defines the second en face image (the slab that defines the first en face image may have the same top layer, but may have its bottom layer defined by the target retinal layer), and the approximation may be based on a weighted combination of the top and bottom layers of the slab that defines the second en face image. The top and bottom layers of the second en face images may be selected based on a confidence measure that these top and bottom layers do not have error. For example, these top and bottom layers may be selected based on a sharpness transition measure from bright to dark or dark to bright in the OCT data. The weighted combination may be based on the positions of these top and bottom layers relative to an expected position of the target retinal layer sandwiched between them.

Other objects and attainments together with a fuller understanding of the invention will become apparent and appreciated by referring to the following description and claims taken in conjunction with the accompanying drawings.

Several publications may be cited or referred to herein to facilitate the understanding of the present invention. All publications cited or referred to herein, are hereby incorporated herein in their entirety by reference.

The embodiments disclosed herein are only examples, and the scope of this disclosure is not limited to them. Any embodiment feature mentioned in one claim category, e.g. system, can be claimed in another claim category, e.g. method, as well. The dependencies or references back in the attached claims are chosen for formal reasons only. However, any subject matter resulting from a deliberate reference back to any previous claims can be claimed as well, so that any combination of claims and the features thereof are disclosed and can be claimed regardless of the dependencies chosen in the attached claims.

BRIEF DESCRIPTION OF THE DRAWINGS

In the drawings wherein like reference symbols/characters refer to like parts:

FIG. 6 shows the mean absolute difference (including 95% confidence interval) and $R^2$ between two readers and between the readers and BM segmentation.

FIG. 12 shows two examples of SRL slabs using MLS IPL 73a segmentation and IPL approximation 73b overlaid on two B-scans where the MLS IPL segmentation is incorrect.

FIG. 19 shows an exemplary OCT B-scan image of a normal retina of a human eye, and illustratively identifies various canonical retinal layers and boundaries.

DESCRIPTION OF THE PREFERRED EMBODIMENTS

Accurate detection of anatomical and pathological structures in Optical Coherence Tomography (OCT) images is critical for the diagnosis and study of retinal diseases. Manual segmentation of feature of interests in each B-scan of an OCT volume scan is not only demanding for expert graders but also extremely time-consuming for clinical use. Another problem is the inherent variability between graders yielding subjective segmentation results. A fully automatic approach for segmenting multiple retinal layer boundaries in B-scans can significantly reduce the processing time required for segmentation.

Segmenting retinal layers using an automated multilayer segmentation approach has several advantages. For example, such tools may save redundant processing for a preprocessing step such as noise reduction, resampling and normalization, OCT cube flattening, etc. Additionally, one can build on an identified segmented layer to determine additional information, such as referencing an unknown layer to one or more known layers, identifying a layer by noting its two neighboring layers that bound it, identify smaller regions for processing, etc. An automated multilayer segmentation tool may also facilitate the implementation of other analysis tools, such as various thickness maps (macular, RNFL, and Ganglion cell thickness) and en face imaging such as structural and angiography en face images. It can also serve as an input to other algorithms such as fovea finder, OCTA decorrelation tail removal, CNV finder algorithms, etc.

Figure 1:
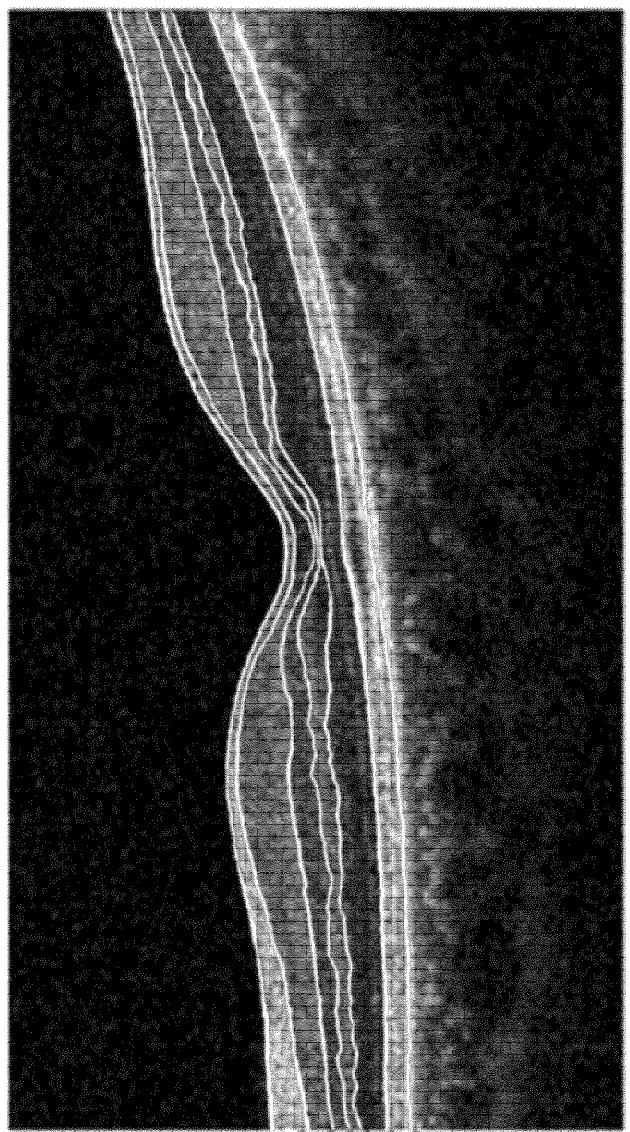
FIG. 1 provides an example of seven retinal layers that may typically be segmented by a state of the art, automated multilayer segmentation tool.

FIG. 1 provides an example of seven retinal layers that may typically be segmented by a state of the art, automated multilayer segmentation tool. Although current tools can successfully segment upper retinal layers automatically, there are additional retinal layers, as discussed below in reference to FIG. 19, such as the Bruch's membrane and the choroid region, that a typical automated multilayer segmentation tool cannot reliably segment, or identify. These layers are typically lower layers where OCT signals may be weaker and prone to higher levels of artifacts, and/or layers with pathologies that alter the typical retinal layer structure of a healthy retina.

Thus, the performance of multilayer segmentation tools becomes an important determinant when structure-altering retinal lesions caused by various retinal diseases are present. There are two main problems with existing automated multilayer segmentation tools. Firstly, they are prone to layer segmentation errors, especially in eyes with intermediate to severe retinal lesions. Secondly, most existing methods are computationally very expensive and may take a few minutes to several hours to compute retinal layer segmentation on a large OCT data cube. Layer segmentation errors can be confounded by OCT imaging errors, such as weak signal quality, eye movement, and morphological complexity and reflectivity changes of retinal structures due to disease. The multilayer segmentation of these cases is beyond the capability of traditional segmentation algorithms.

The present invention provides a method and system for automatically segmenting retinal layers not typically included in an automated segmentation tool, such as the Bruch's membrane (BM) and the choroid. To better segment these layers, the present invention enhances the contrast the structural OCT B-scans, using corresponding OCTA B-scans, around the BM (or other target retinal layer) by removing or attenuating the OCT signal below the BM such as choroid and sclera portions without using any prior segmentation.

Figure 2:
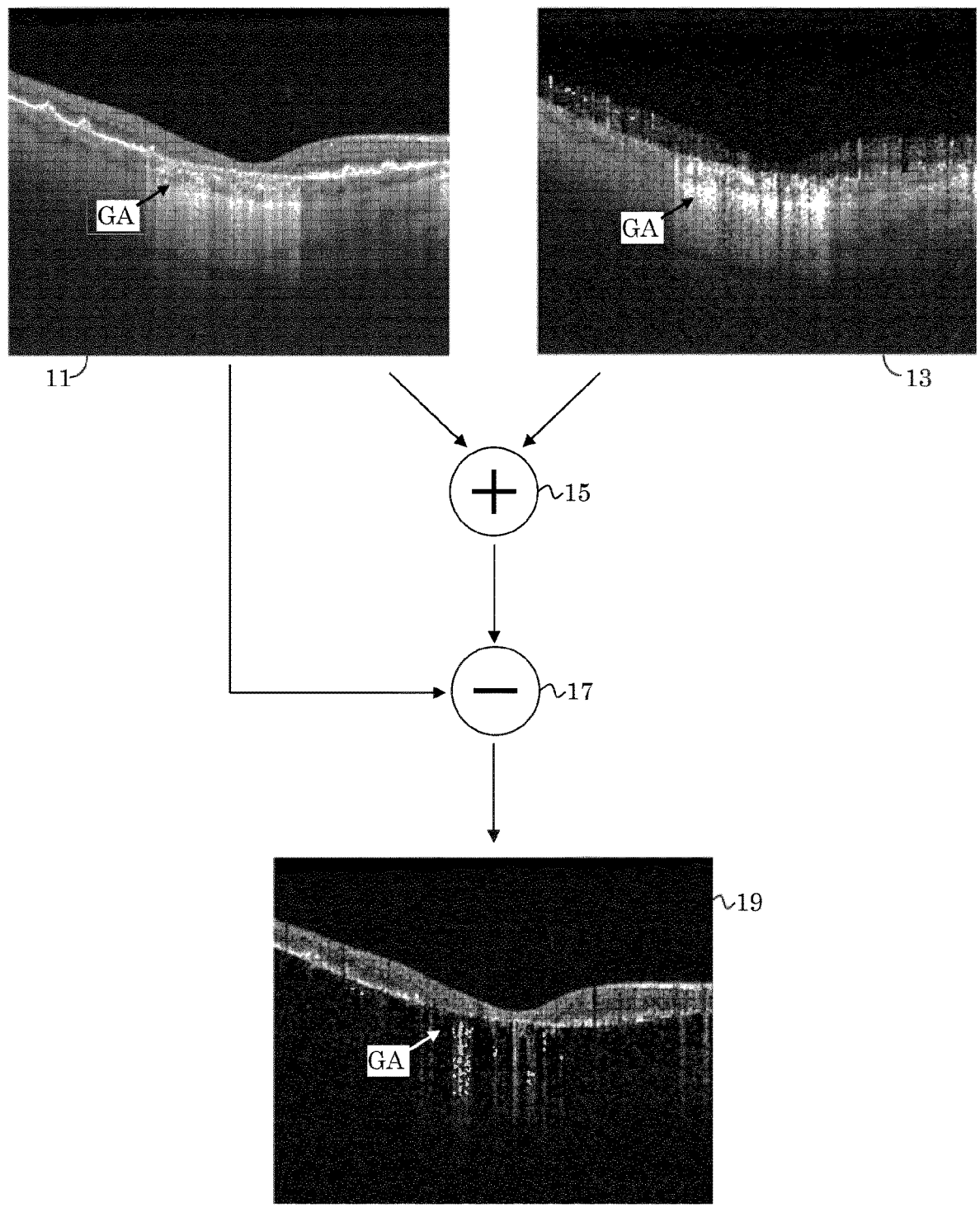
FIG. 2 shows a structural OCT B-scan of an eye with geographic atrophy (GA), and a corresponding OCTA B-scan.

FIG. 2 shows a structural OCT B-scan 11 of an eye with geographic atrophy (GA), and a corresponding OCTA B-scan 13. The OCT data 11 and OCTA data 13 are mixed, as illustrated by block 15, and the resultant mixed signal is then subtracted from the OCT data 11, as illustrated by block 17, to produce enhanced structural data/image 19. The enhanced structural image 19 shows much higher contrast, particularly in the GA area, which permits segmenting of the BM even within this pathology region. BM segmentation using OCT or OCTA without normalization would be a hard problem due to low contrast in OCT around the BM, and decorrelation tails in OCTA, and no clear interface would be available around BM layer.

Figure 3:
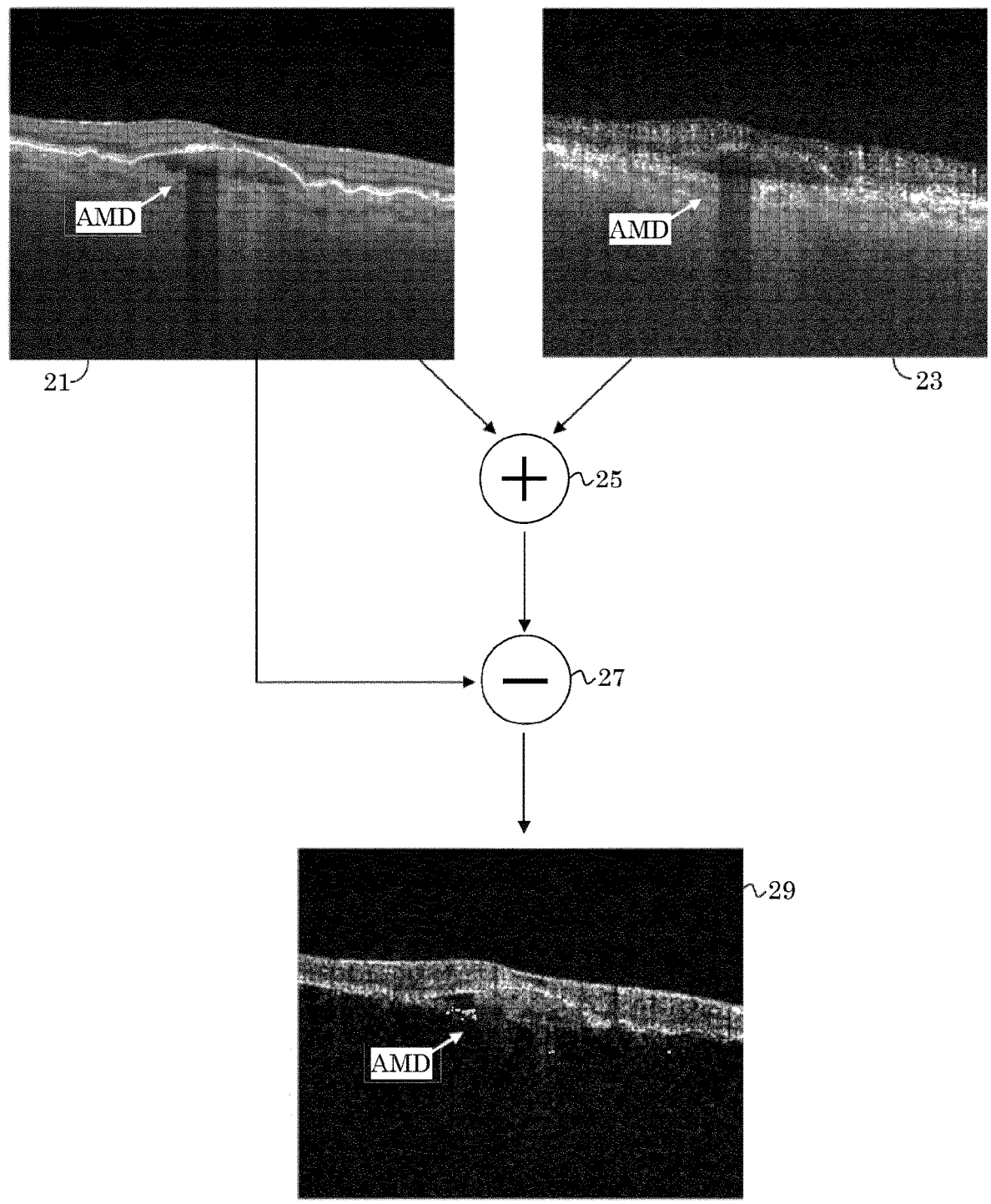
FIG. 3 shows a structural OCT B-scan of an eye with age-related macular degeneration (AMD), and a corresponding OCTA B-scan.

FIG. 3 shows a structural OCT B-scan 21 of an eye with age-related macular degeneration (AMD), and a corresponding OCTA B-scan 23. Again, the OCT data 21 and OCTA data 23 are mixed, as indicated by block 25, and subtracted (e.g., block 27) from the OCT data 21 to produce enhanced structural image/data 29. As can be seen, the enhanced structural image 29 shows higher contrast below the retinal pigment epithelium (RPE) retinal layer.

The production of an enhanced structural image 19/29 may constitute all or part of a first stage of a two (or more) stage image segmentation process. That is, after the enhanced OCT data is produced in a first stage, any suitable segmentation method/algorithm may then be applied to the enhanced OCT data (e.g., 19 and/or 29) in one or more subsequent stage to provide automated (or semi-automated) segmentation.

Herein, several common frameworks and methods for automated and semi-automated multilayer segmentation are presented. One such automated segmentation method, discussed below in association with FIGS. 13 to 17, is relatively fast and can be used in commercial products. This approach identifies a starting position (e.g., a propagation starting position and/or B-scan) either automatically or manually, and propagates the multilayer segmentation information, e.g., to adjacent B-scans and/or proximate B-scans (e.g., B-scans within a predefined distance from a current position, e.g., from the starting position to another B-scan). Another segmentation approach suitable for use with the present two (or more) stage image segmentation method may use a graph search algorithm based on contrast enhanced structural OCT data. Irrespective of the segmentation method used, each stage may apply segmentation to different resolutions of the enhanced (OCT) data. That is, the enhanced (OCT) data may be downsampled to different resolution levels, and each resolution level may be submitted to a different stage of the segmentation process, wherein the first stage of the segmentation process segments the lowest resolution, and the output of each stage is a starting segmentation for the next stage, and the resolution of the next stage is equal to, or higher, than the previous stage.

In the case of the present, exemplary two (or more) stage segmentation process, in the first stage, the selected image segmentation method being used produces a preliminary rough segmentation result. Thereafter, by taking the baseline of the segmentation of the first stage as an initial segmentation, the second stage of the segmentation process can begin by segmenting below the baseline (using any suitable segmentation method) to get the final segmentation result. Due to the suitable initialization (e.g., initial segmentation) from the first stage, the second (and subsequent) stage(s) can achieve a desirable segmentation result, even for difficult images.

Figure 4:
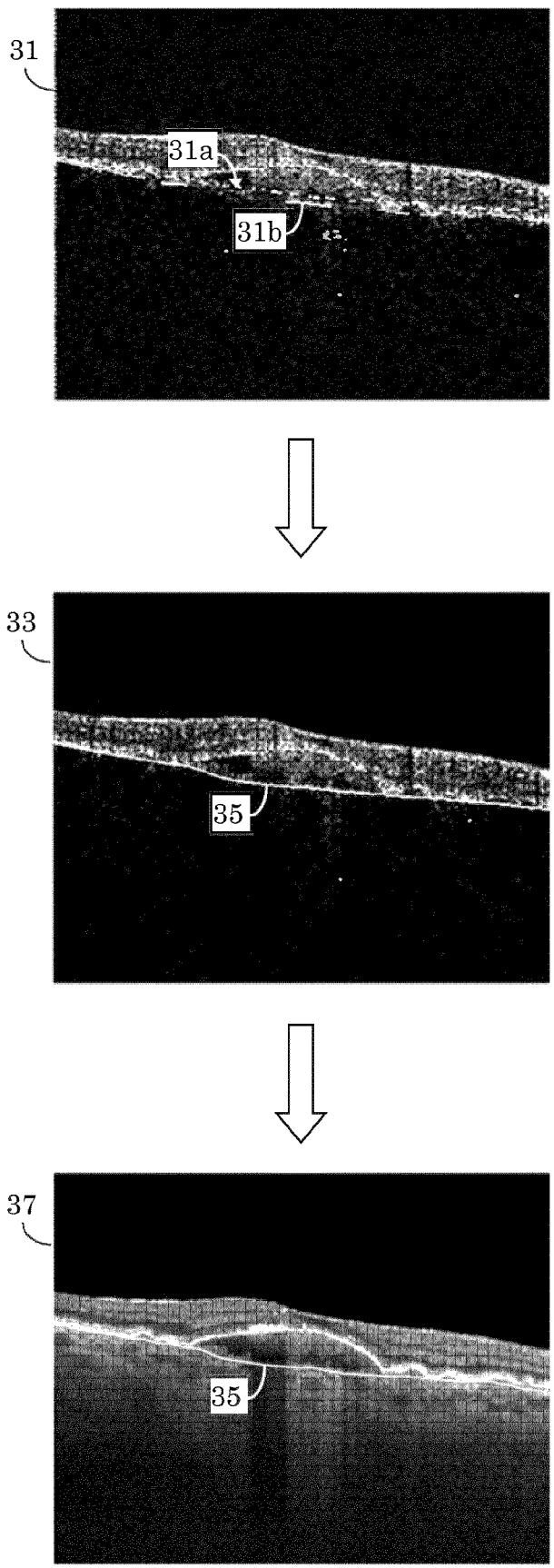
FIG. 4 illustrates the application of a 2-stage segmentation process to enhance data in accord with the present invention.

FIG. 4 illustrates the application of the present 2-stage segmentation process to enhanced data. An embodiment of the present invention may include the following steps:

1) Enhance structural OCT by removing or attenuating the choroid regions in structural OCT volume using corresponding OCTA volume.

$$V_e = V_s - \alpha(w_1 V_s + w_2 V_a)$$

$$\hat{\alpha} = \operatorname{argmin}_\alpha f((w_1 V_s + w_2 V_a), V_s - \alpha(w_1 V_s + w_2 V_a))$$

$V_s$: structural OCT volume
$V_a$: OCTA volume
$V_e$: enhanced structural OCT volume
$w_1$, $w_2$: weights for OCT and OCTA volumes
$f$: objective function (e.g. square of normalize cross correlation, mutual information)
$\alpha$: parameter to optimize
The solution is $$\hat{\alpha} = \frac{\operatorname{Cov}(w_1 V_s + w_2 V_a, V_s)}{\operatorname{Var}(w_1 V_s + w_2 V_a)},$$

where Cov is the covariance and Var is the variance, if the objection function $f$ is square of normalize cross correlation.

2) The first stage as initial segmentation consists of the segmentation of each B-scans of $V_e$ with high confidence followed by a baseline calculation. The baseline is used for the second stage of the segmentation.

In FIG. 4, image 31 show the initial segmentation on an enhanced image (e.g., $V_e$) with high confidence 31a, and the baseline 31b computed from a 2-D fit.

3) The second stage consists of the final segmentation by segmenting below the initial segmentation. In FIG. 4, image 33 shows the final segmentation 35 plotted over the enhanced (e.g., $V_e$). This segmentation may then be ported to the original OCT data (e.g., structural B-scan), as shown in image 37.

In the present embodiment, the segmentation method in the first and second stage is a graph search algorithm, but other segmentation methods may be used as well.

As mentioned above, the present invention may be used in a method for automated Bruch's membrane segmentation in optical coherence tomography. Accurate Bruch's membrane (BM) segmentation is essential to characterize possible choriocapillaris loss, as well as elevations and dysfunctions of the retinal pigment epithelium, which are important diagnostic indicators of retinal diseases. The present BM segmentation method/system may be applied to OCT volumes.

The present exemplary BM segmentation method enhances the BM layer by using both structural ($V_s$) and flow ($V_a$) OCT volumes. The enhanced OCT volume ($V_e$) is calculated by subtracting a proportion of mixture of structural and flow data from the structural data, such as $V_e = V_s - \alpha(w_s V_s + w_a V_a)$, where $w_s$ and $w_a$ are weights (e.g., set to 0.5). Proportionality factor $\alpha$ may be defined as $\alpha = \operatorname{Cov}(w_s V_s + w_a V_a, V_s) / \operatorname{Var}(w_s V_s + w_a V_a)$ assuming the similarity (squared normalized cross correlation) between $V_e$ and the mixture ($w_s V_s + w_a V_a$) is minimized. This segmentation method is based on a multiresolution approach and a graph search algorithm. The segmentation baseline of each resolution level is used as a starting segmentation for the segmentation of the next higher resolution. In the present example, the number of resolution levels is set to two for faster processing. Performance of the algorithm is evaluated by comparison to manual edits from two readers using 120 B-scans extracted from 40 OCTA cube scans of prototype 3×3 mm, 6×6 mm, 9×9 mm, 12×12 mm, and 15×9 mm acquired using 200 kHz PLEX® Elite 9000 (ZEISS, Dublin, CA). All scans were mix of disease cases such as DR and AMD.

Figure 5A:
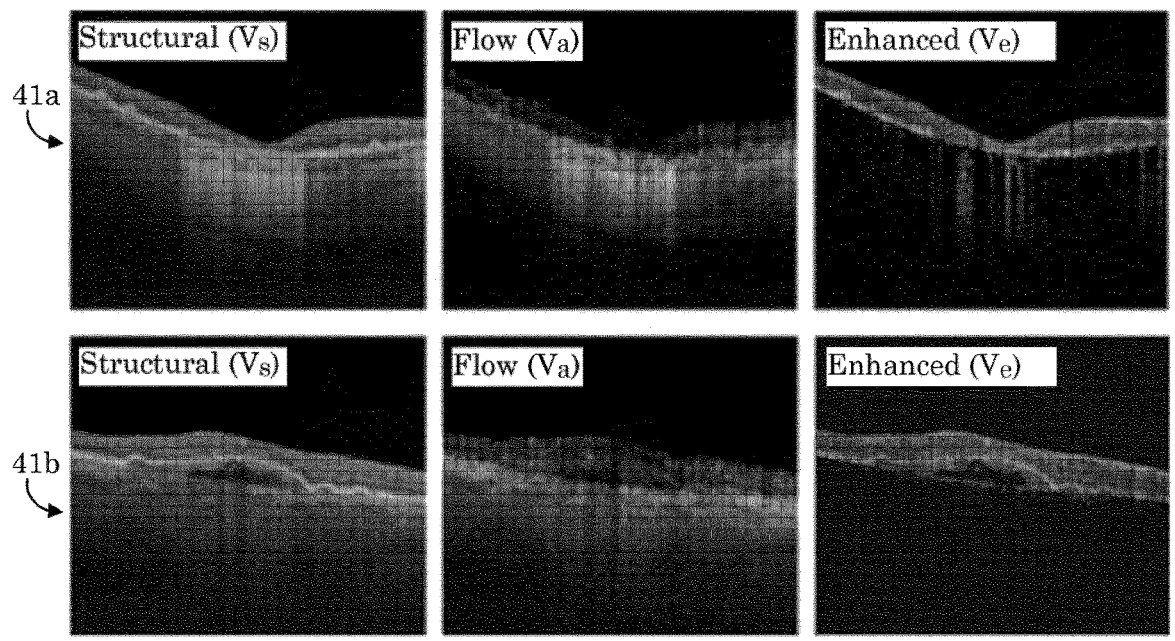
FIG. 5A shows two examples of enhanced OCT data for BM visualization using structural and flow data.
Figure 5B:
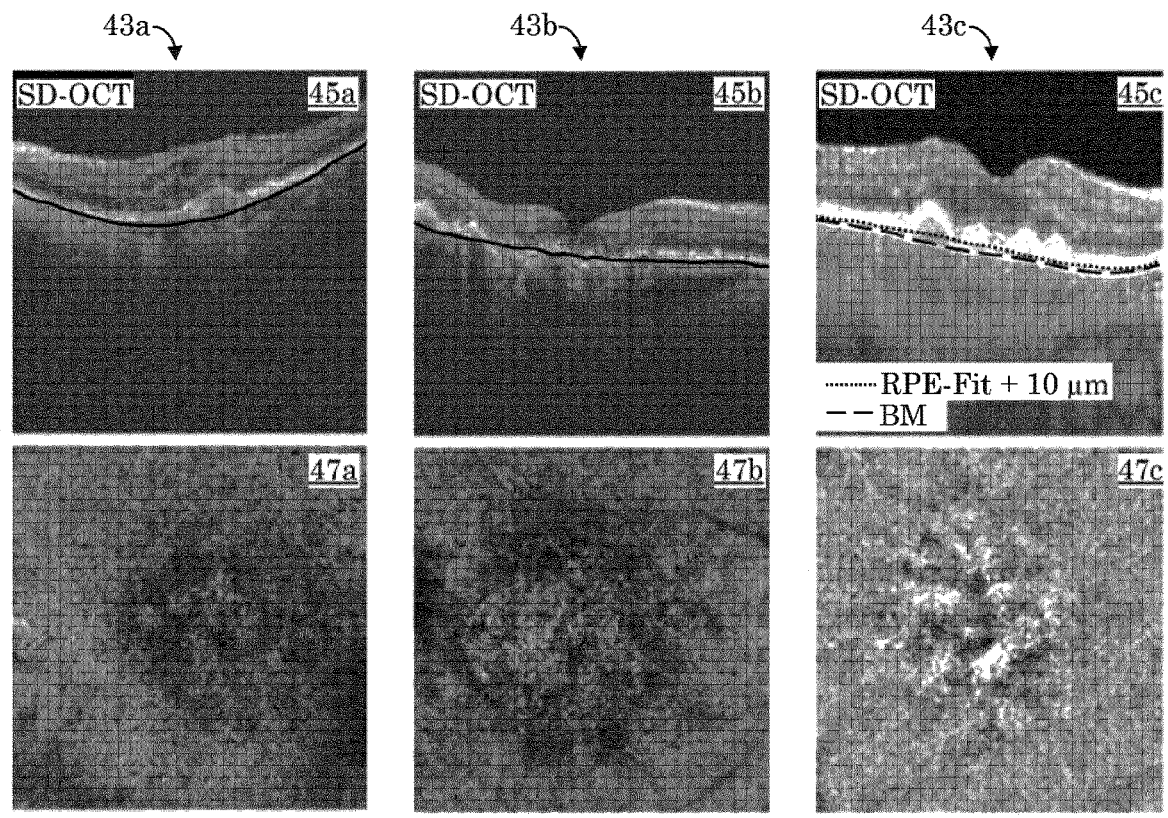
FIG. 5B shows three examples of BM segmentation with corresponding choriocapillaris vasculature maps.

FIG. 5A shows two examples 41a and 41b of enhanced OCT data (Ve) for BM visualization using structural (Vs) and flow (Va) data, and FIG. 5B shows three examples 43a, 43b, and 43c of BM segmentation 45a, 45b, and 45c with corresponding choriocapillaris vasculature maps 47a, 47b, and 47c. Examples 41a and 41b show enhanced OCT B-scans (Ve) with corresponding structural OCT (Vs) and flow (Va) OCTA B-scans. Examples 43a, 43b, and 43c show the segmentation results 45a, 45b, and 45c with corresponding choriocapillaris slabs 47a, 47b, and 47c by using OCTA flow data (e.g., an OCTA slab defined) between BM and BM+20 µm.

FIG. 6 shows the mean absolute difference (including 95% confidence interval) and $R^2$ between two human readers and between the human readers and subject BM segmentation. The mean absolute difference for each scan pattern demonstrates strong correlation and great agreement between the readers and BM segmentation.

Overall the automated and manual segmentations have a strong correlation and great agreement. Automated segmentation may be a valuable diagnostic tool for retinal diseases.

Figures 7, 8:
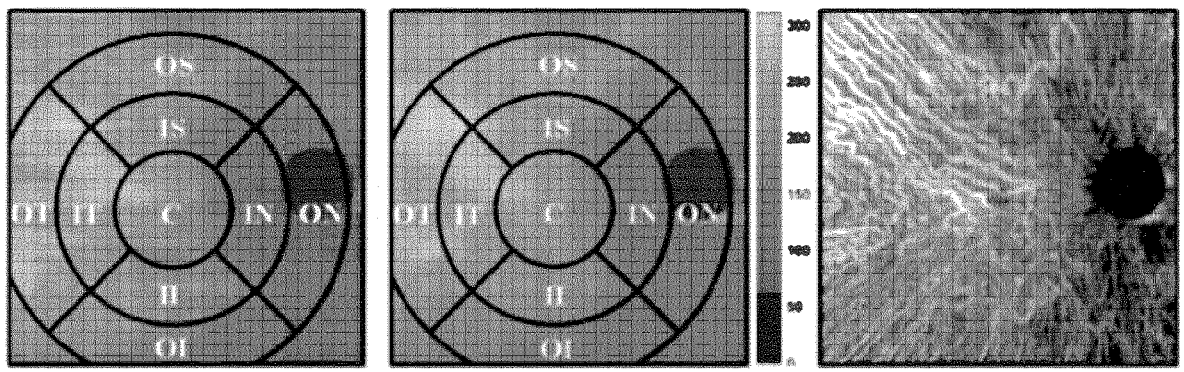
FIG. 7 shows a choroidal thickness map (in microns) of a right eye, generated using manual (left) and automated (middle) segmentation, with overlaid ETDRS grid centered on the fovea, and a structural choroidal vasculature map (right).
FIG. 8 provides a table showing information extracted from regression and Bland Altman analyses for each sector of the ETDRS grid.

Another exemplary embodiment shows a method for automated choroidal-scleral interface segmentation in optical coherence tomography. A relatively fast algorithm was developed to segment the choroidal-scleral interface. The present segmentation starts from a B-scan with high contrast around choroidal-scleral boundary. Then the segmentation is propagated to the entire volume data. The algorithm uses the intensity as well as gradient images as inputs to a graph-based method to segment each B-scan in a region of interest. Performance of the algorithm is evaluated using 49 normal SS-OCT volume data of 500×500 A-scans over 12×12 mm acquired using PLEX® Elite 9000 SS-OCT (ZEISS, Dublin, CA). The choroidal thickness maps using manual and automated segmentation were generated, defined as the distance between a fitted RPE baseline and the choroidal-scleral interface. The performance of the present embodiment is reported using regression and Bland Altman analyses for each sector of the ETDRS grid. FIG. 7 shows a choroidal thickness map (in microns) of a right eye, generated using manual (left) and automated (middle) segmentation, with overlaid ETDRS grid centered on the fovea, and the structural choroidal vasculature map (right). The ETDRS grid consists of three concentric circles of 2, 4, and 6 mm radius centered on the fovea. The choroidal thickness map of FIG. 7 is generated by manual and automated segmentation, and corresponding structural choroidal vasculature map.

FIG. 8 provides a table showing the information extracted from regression and Bland Altman analyses for each sector of the ETDRS grid. The regression and Bland-Altman analyses for all sectors demonstrate strong correlation and good agreement between the manual and automated method. The average processing time is less than 4 seconds using Intel i7 CPU, 2.7 GHz with 32 GB memory. Overall, the choroidal thickness maps generated by automated and manual segmentation have a strong correlation and good agreement.

As shown, the present invention provides good results in an automated segmentation system, but as mentioned above, automated segmentation systems, in general, may occasionally produce erroneous results due to a myriad of factors beyond the control of the automated segmentation system. For example, segmentation errors may occur due to weak OCT signal quality, eye movement, or morphological complexity and reflectivity changes of retinal structures in disease cases. In light of such issues associated with automated (and manual) segmentation system, the present invention also proposes a method to identify and replace segmentation failure of retinal layers with a segmentation approximation.

In the past, segmentation confidence at each layer point has been used to determine the segmentation quality. The segmentation confidence is usually determined based on the strength of the cost image (e.g. gradient image) at a given segmentation point. This method may not work well as one segmentation could jump to a neighboring layer segmentation and yet have high confidence.

In the present invention, OCTA flow data may be used to determine the segmentation quality of OCT structural data. Alternatively, OCT data could be used for this propose as well. In the present example, the similarity of OCTA vasculature slabs may be used as an indicator of specific layer segmentation failure. The segmentation failure may be identified locally and replaced by an approximation.

The present embodiment automatically identifies a segmentation failure using angiography retinal layer slabs. For instance, an Inner Plexiform Layer (IPL) layer segmentation failure can be detected using the Inner Limiting Membrane (ILM) and Outer Plexiform Layer (OPL) layers to generate ILM-IPL and ILM-OPL angiography (or structural) slabs assuming the IPL and ILM segmentations are reasonably correct. Using the ILM and OPL segmentations for this purpose usually performs better than using the Retinal Nerve Fiber Layer (RNFL), IPL, and Inner Nuclear Layer (INL) due to the sharper transition from various (dark) to RNFL (bright) for the ILM and from OPL (bright) to the avascular zone (dark). For this example, it is expected that the local similarity between ILM-IPL and ILM-OPL angiography slabs is high if IPL segmentation worked reasonably well. The local similarity is an indication of failure of IPL segmentation. The slabs may be generated based on maximum projection within defined layer boundaries in OCTA volume data (or other suitable method for defining an en face image). In the case of IPL segmentation failure, the IPL segmentation is replaced with an IPL approximation based on the weighted average of the ILM and OPL. The same approach can be used to identify OPL segmentation failure (or failure of other target retinal layer) by appropriate selection of reference layer segmentations. For example, IPL or IS/OS segmentation may be used as reference layer segmentations if the segmentations of these layers are correct.

In summary, the present embodiment can automatically identify local segmentation failure of a retinal layer boundary using angiography retinal layer slabs. In the following example, IPL layer segmentation failure is detected using ILM and outer OPL layers to generate ILM-IPL and ILM-OPL angiography slabs under the assumption that IPL and ILM segmentation are acceptable. ILM and OPL segmentations for this purpose usually perform better than other inner retinal layers segmentation (such as RNFL, IPL, and INL) due to the sharper transition from various (dark) to RNFL (bright) for ILM and from OPL (bright) to avascular zone (dark).

It is expected that the local similarity between ILM-IPL and ILM-OPL angiography en face images (or slabs) is high if IPL segmentation worked reasonably well. The local similarity is an indication of failed IPL segmentation. In the present example, the en face slab images are generated based on maximum projection within defined layer boundaries in OCTA volume data. If IPL segmentation fails, then the IPL segmentation can be replaced with IPL approximation based on the weighted average of ILM and OPL.

Figure 9:
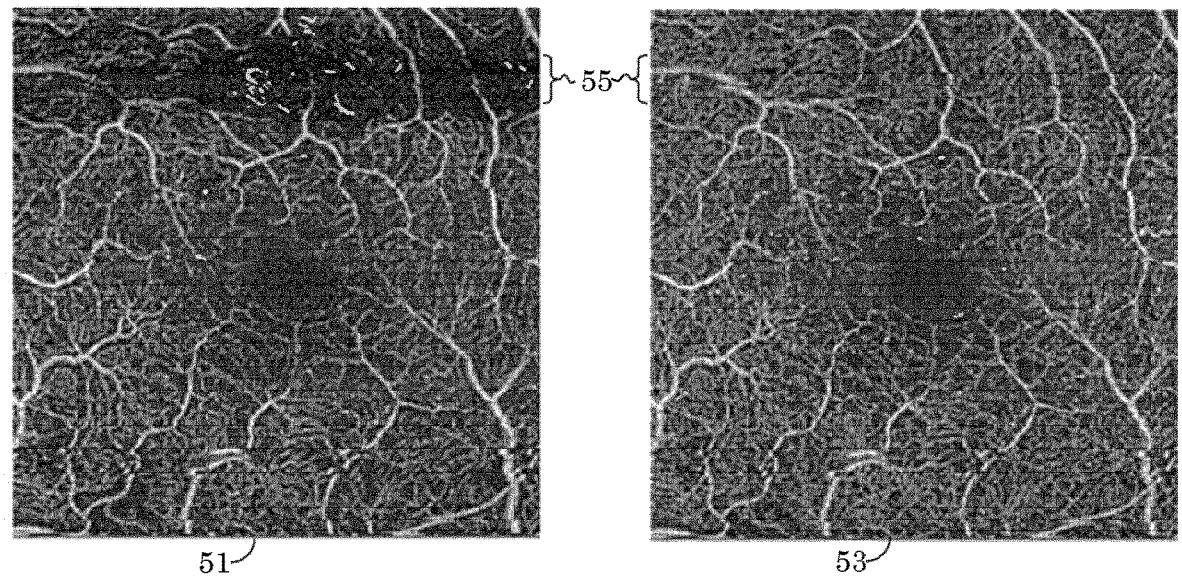
FIG. 9 shows an exemplary ILM-IPL en face angiography slab image and an exemplary ILM-OPL angiography en face slab image defined using segmentation algorithm outputs from an automated segmentation tool.

FIG. 9 shows an exemplary ILM-IPL en face angiography slab image 51 and an exemplary ILM-OPL angiography en face slab image 53 defined using segmentation algorithm outputs from an automated segmentation tool. As shown, most of en face images 51 and 53 are similar indicating no segmentation failure. However, local region 55 in en face image 51 is dissimilar from the corresponding local region 55 in en face image 53 indicating that segmentation of the IPL failed in this local region. A reason for the dissimilarity may be that the slab of image 51 is defined based on the automated IPL segmentation, and a failure in segmentation would cause the slab of image 51 to not following the true shape of the IPL (e.g., the bottom layer that defines this slab). The similarity between each row (e.g., corresponds to each B-scan) of the ILM-IPL 51 and ILM-OPL 53 angiography slabs can be measured by normalized cross correlation (NCC) between each rows of these two slabs.

Figure 10:
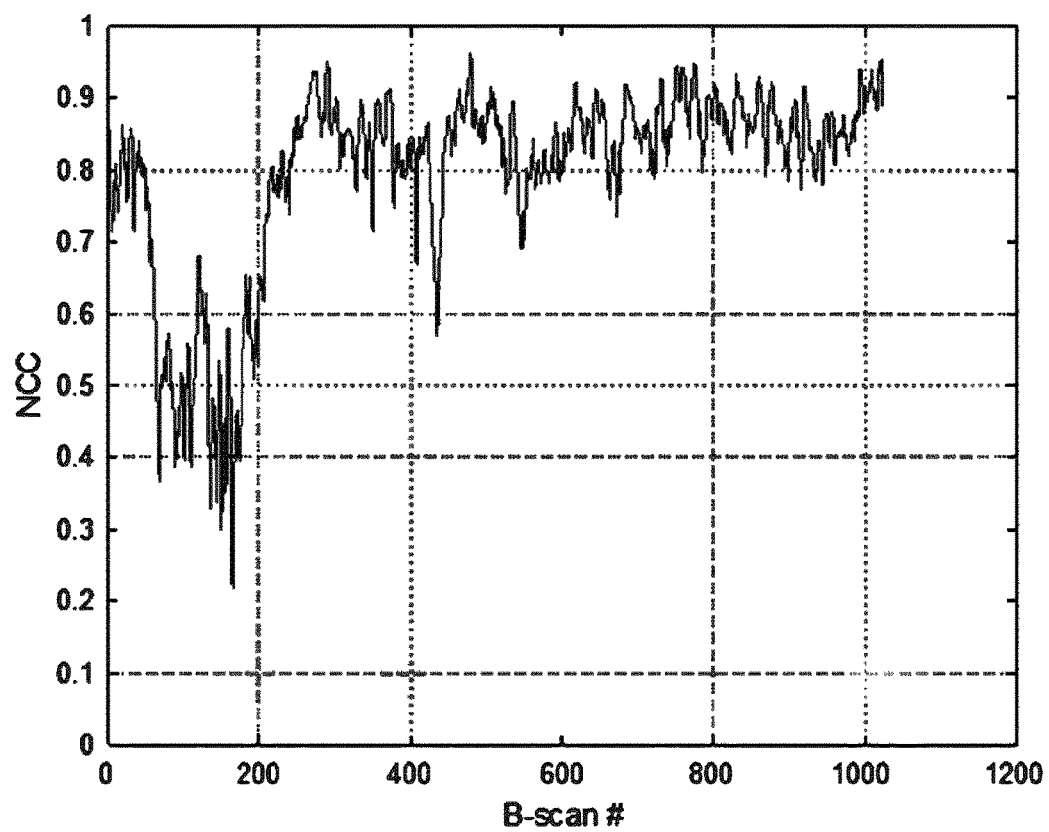
FIG. 10 provides a plot that shows the normalized cross correlation (NCC) of all rows (B-scans) compared in the en face images of FIG. 9.

FIG. 10 provides a plot that shows the NCC of all rows (B-scans), numbered from 0 at the top to 1200 towards the bottom. As it can be seen in the plot, the similarity in a top portion (e.g., a continuous local region) of the angiography slabs (e.g., from about B-scan 50 to 200) is low relative to other parts of the angiography slabs. This is an indication of IPL segmentation failure in this top portion. If the NCC of a B-scan is smaller than a predefined threshold (e.g., 0.5-0.7, or other suitable value), then an IPL segmentation failure is determined to have occurred in that B-scan.

The IPL segmentation of this failed region can be replaced by IPL segmentation approximation based on the weighted average of ILM and OPL (e.g. 0.4*ILM+0.6*OPL). For example, weights the ILM (top layer) and OPL (bottom layer) may be based on their positions relative to an expected position of the target retinal layer. Other layers may be determined/approximated/checked based on the IPL approximation. RNFL segmentation approximation can be computed based on the weighted average of ILM and IPL approximation (e.g. 0.8*ILM+0.2*IPL approx). INL segmentation approximation can be computed based on the weighted average of OPL and IPL approximation (e.g. 0.6*OPL+0.4*IPL approx).

Figure 11:
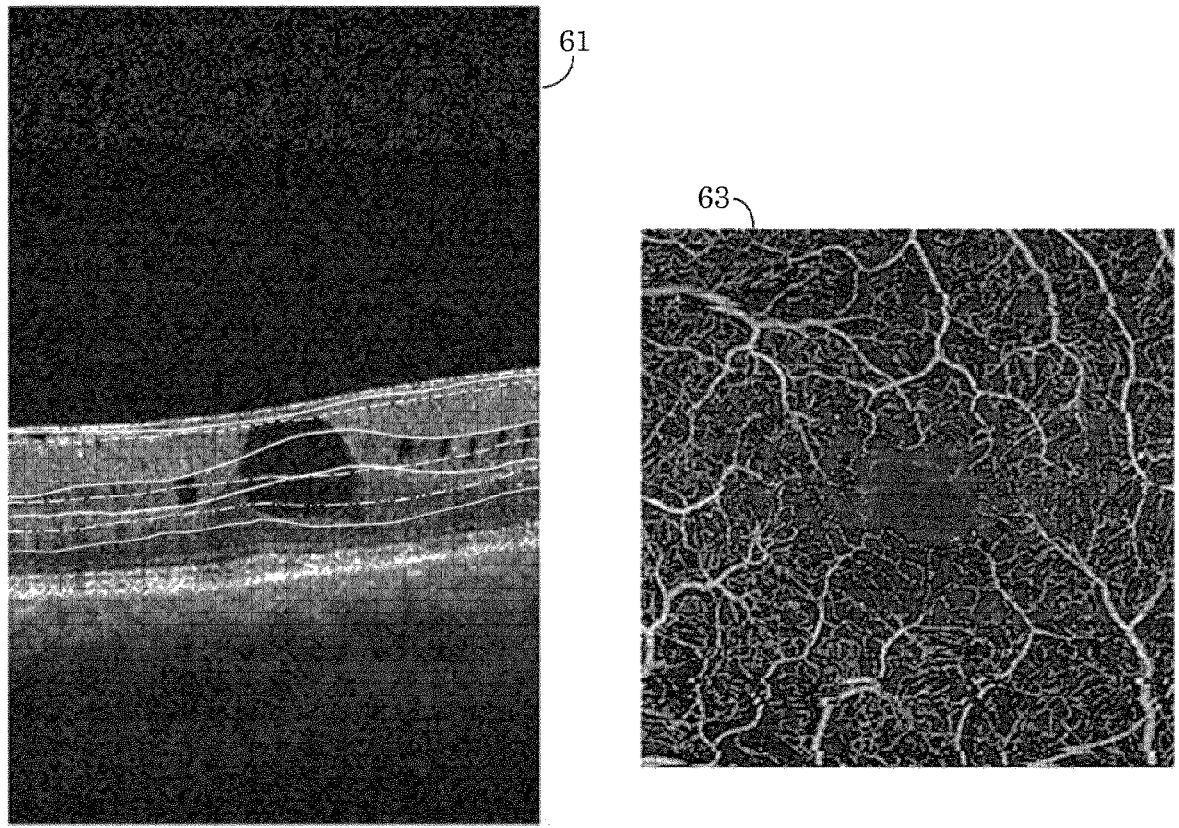
FIG. 11 shows a B-scan and an ILM-IPL en face slab image, where the IPL segmentation of volume data is replaced by IPL segmentation approximation.

Alternatively, if the variance of NCC function of all B-scans is smaller than a threshold, then the IPL segmentation of the volume data can be replaced by IPL segmentation approximation. FIG. 11 shows a B-scan 61 and ILM-IPL en face slab 63 where the IPL segmentation of volume data is replaced by IPL segmentation approximation. In B-scan 61, solid and dashed lines represent the segmentation and approximation results of RNFL, IPL, and INL, respectively. The local segmentation failure can also be determined by finding the similarity between the ILM-IPL and ILM-OPL angiography slabs in a window spanning part of a B-scan (or parts of a group of B-scans) rather than the entire B-scan as described above.

In summary, in the present embodiment, OCT Angiography is used for segmentation failure identification. The present process may use two or more reference layer segmentations, and identifies local segmentation failures.

In an example implementation, the present invention was used to provide automated inner retinal layer segmentation approximation for advanced retinal disease cases in optical coherence tomography angiography (OCTA).

In general, automated multilayer segmentation (MLS) methods determine the desired inner layer boundaries. However, they are prone to layer misidentification errors, especially in eyes with retinal lesions and data with poor quality. The inner layer boundaries for such cases are often not identifiable manually. The present example implementation provides an automated outer boundary of inner plexiform layer (IPL) segmentation approximation method using OCTA volumes.

MLS detects IPL segmentation failure using internal limiting membrane (ILM)-IPL and ILM-outer plexiform layer (OPL) angiography slabs generated based on ILM segmentation and the outer boundary of OPL segmentation. This assumes that the ILM and OPL segmentations are correct. It is expected that the local similarity, measured by normalized cross correlation (NCC), between ILM-IPL and ILM-OPL angiography slabs is low if MLS IPL segmentation malfunctioned as these slabs are generated based on maximum projection. If the variance of NCC is smaller than a threshold, then the MLS IPL segmentation is replaced by IPL segmentation approximation as weighted average of the ILM segmentation and OPL segmentation, otherwise MLS IPL segmentation is used.

Performance of the present implementation was evaluated using 161 Angiography volume data over 3×3 mm (76 scans), 6×6 mm (67 scans), 8×8 mm (2 scans), 12×12 mm (7 scans), HD 6×6 mm (6 scans), HD 8×8 mm (3 scans) acquired using CIRRUS™ HD-OCT 6000 with AngioPlex® OCT Angiography (ZEISS, Dublin, CA). Data included a mix of retinal diseases. A clinical grader evaluated each superficial retinal layer (SRL) slab generated with the new algorithm as success or failure.

FIG. 12 shows two examples of SRL slabs 71 and 72 before and after correction (e.g., original slabs with MLS segmentation with error 71A/72A and post-corrected slabs 71B/72B). Both slabs 71 and 72 show MLS IPL segmentation 73*a* (e.g., cyan dashed-line in a color image or dotted-line in a black-and-white, monochrome image) and IPL approximation 73*b* (e.g., cyan solid line in a color image or dashed-line in a monochord image) overlaid on two B-scans where the MLS IPL segmentation is incorrect. As shown in post-corrected slabs 71B and 72B, the IPL approximation creates a more accurate representation of SRL for these cases. MLS IPL segmentation of thirty-four (21%) of the scans were replaced by IPL approximation. Success rate of MLS without IPL approximation and with approximation was 79% and 96%, respectively. Thus, the present example implementation produced acceptable SRL slabs when MLS IPL segmentation performance suffered from severe retinal disease or poor image quality.

Figure 13:
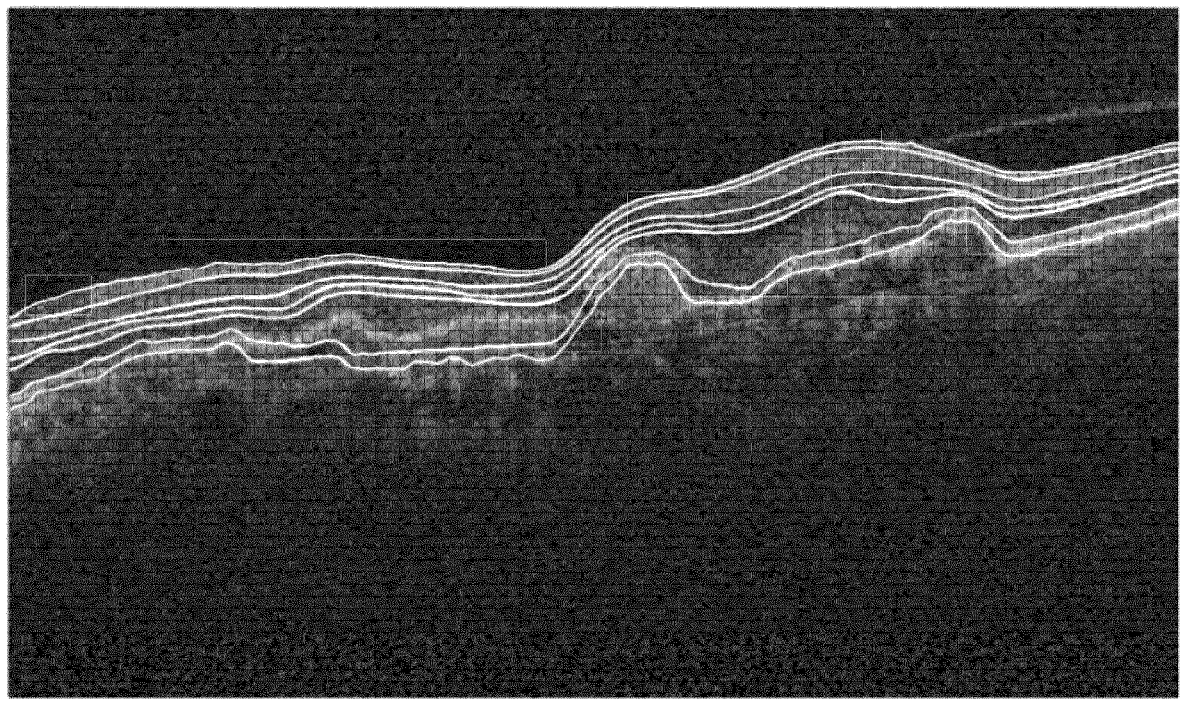
FIG. 13 shows an image (FOV=8 mm) with automated segmentation failures at the IS/OS junction.
Figure 14:
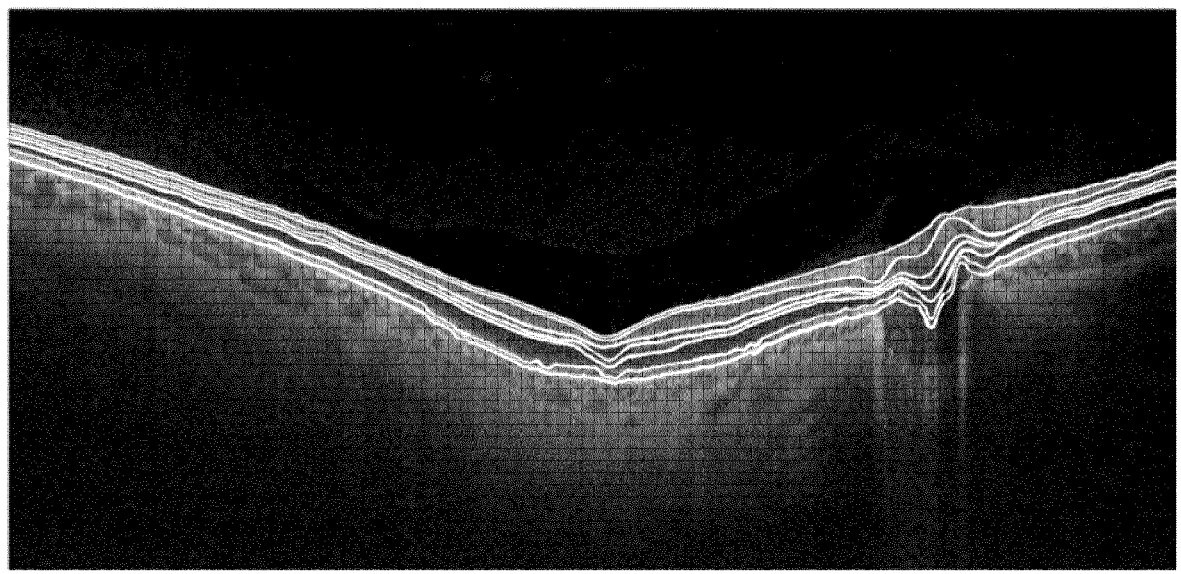
FIG. 14 shows an image (FOV=16 mm) with automated segmentation failures in fovea region.

Herein is now presented the above-mentioned, alternate, exemplary segmentation method that identifies a starting position (e.g., a propagation starting position and/or B-scan) either automatically or manually, and propagates the multi-layer segmentation information. For illustration purposes, FIG. 13 shows an image (FOV=8 mm) with automated segmentation failures at the IS/OS junction, which affected the RPE segmentation as well. By correcting the IS/OS segmentation manually, followed by propagation, the RPE can be re-segmented correctly automatically. Similarly, FIG. 14 shows an image (FOV=16 mm) with automated segmentation failures in fovea region, which affected the inner retinal layers as well as IS/OS and RPE segmentation. Again, manual correction in fovea region followed by propagation can correct the segmentation in this region.

The present embodiment is an automated method based on propagation of multilayer segmentation to the entire OCT volume starting from a B-scan with best contrast in inner/outer retina. This is in contrast to prior propagation methods, which are semiautomatic and limited to propagation along a single layer boundary. The present embodiment may use a semi-automated method in a manner similar to the present automated method except that the starting B-scan would be selected and/or partially edited by a human expert. In semi-automated method, it would be possible to edit a subset of layer boundaries of the starting B-scan. Then the automated part of the present algorithm could still segment unedited remaining layer boundaries prior to propagation.

The present automated method is relatively fast making it suitable for used in a commercial applications. The present automated method is based on the idea of multilayer segmentation propagation (e.g., propagation is based on multilayer boundaries simultaneously). This automated method naturally starts from the portion of the retinal scan which has healthy structures as normal cases, or from the enhanced OCT data (image), or other suitable good-quality portion of an image (OCT data). Starting the segmentation from a healthy part of the retina (a B-scan), and due to smooth transition to neighboring B-scans makes this propagation algorithm relatively fast and robust.

Herein are described general concepts of automated segmentation propagation. Preprocessing methods suitable for use with the present invention are described in U.S. Pat. No. 10,169,864, assigned to the same assignee as the present invention. However, the actual segmentation and propagation workflow is different.

Figure 15:
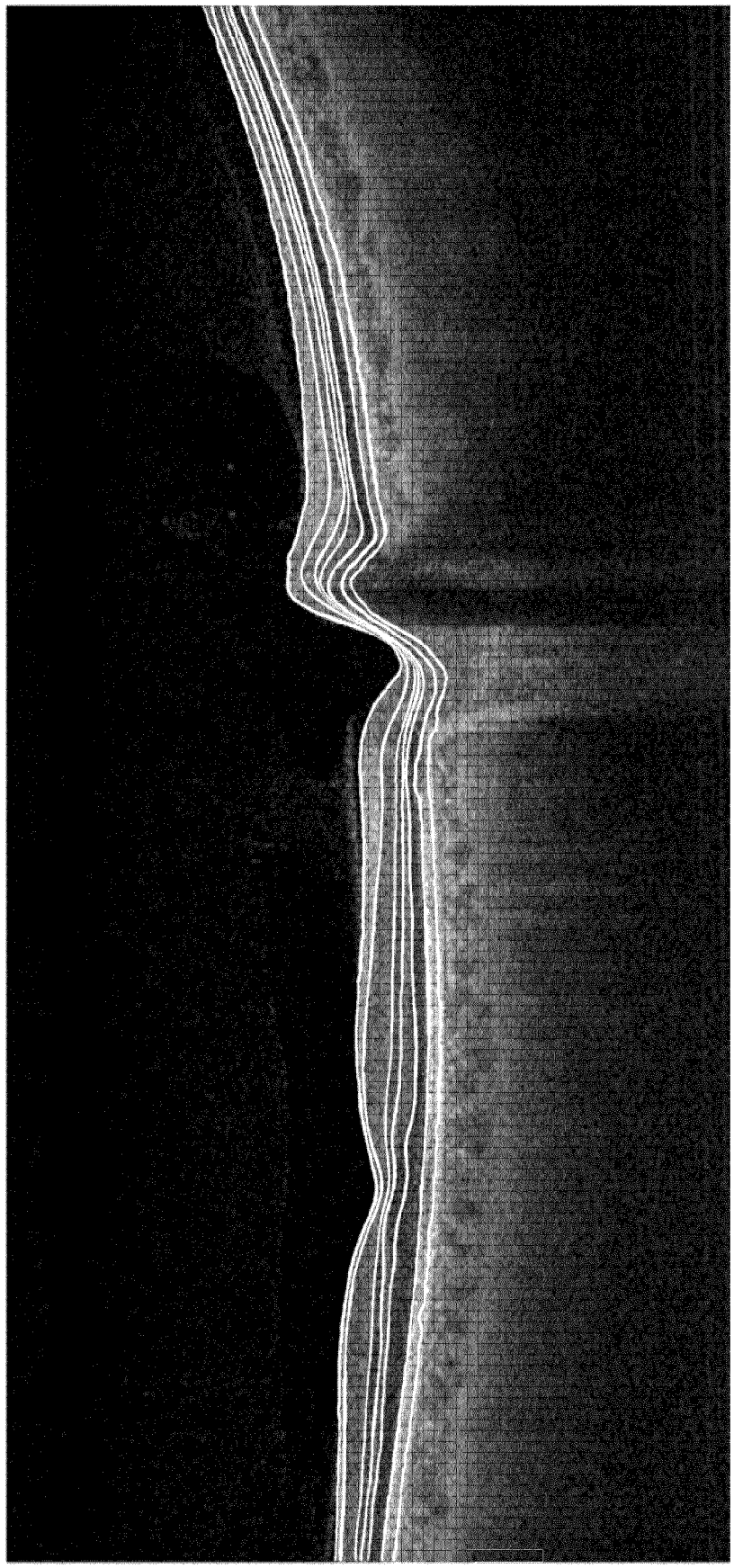
FIG. 15 illustrates an example of an OCT B-scan (FOV=12 mm) with overlying segmentations (from top to bottom) representing various retinal layer boundaries, similar to those illustrated in FIG. 19.

FIG. 15 illustrates an example of an OCT B-scan (FOV=12 mm) with overlying segmentations (from top to bottom) representing various retinal layer boundaries (similar to those shown in FIG. 19), which include the inner limiting membrane (ILM), the outer boundary of retinal nerve fiber layer (RNFL or NFL), the outer boundary of inner plexiform layer (IPL), the outer boundary of inner nuclear layer (INL), the outer boundary of outer plexiform layer (OPL), and the IS/OS junction, and the retinal pigment epithelium (RPE).

The layer boundaries with positive axial gradient (dark to bright transition) generally include the boundary between the vitreous and the ILM, the upper boundary of the bright line associated with the IS/OS, and the lower boundary of the bright line associated with the INL. The layers with negative axial gradient (bright to dark transition) generally include the outer boundary of the RNFL, the outer boundary of the IPL, and the outer boundary of the OPL (and the outer boundary of BM.

For example, the layer boundaries with positive axial gradient can be segmented simultaneously or one by one in a B-scan. These segmentations can serve as baseline for segmentation of adjacent B-scans. Also these segmentations can define regions of interest in adjacent B-scans for segmentations of the layer boundaries with either positive or negative axial gradient. The layer boundaries with negative axial gradient can be segmented simultaneously or one by one in a B-scan.

Figure 16:
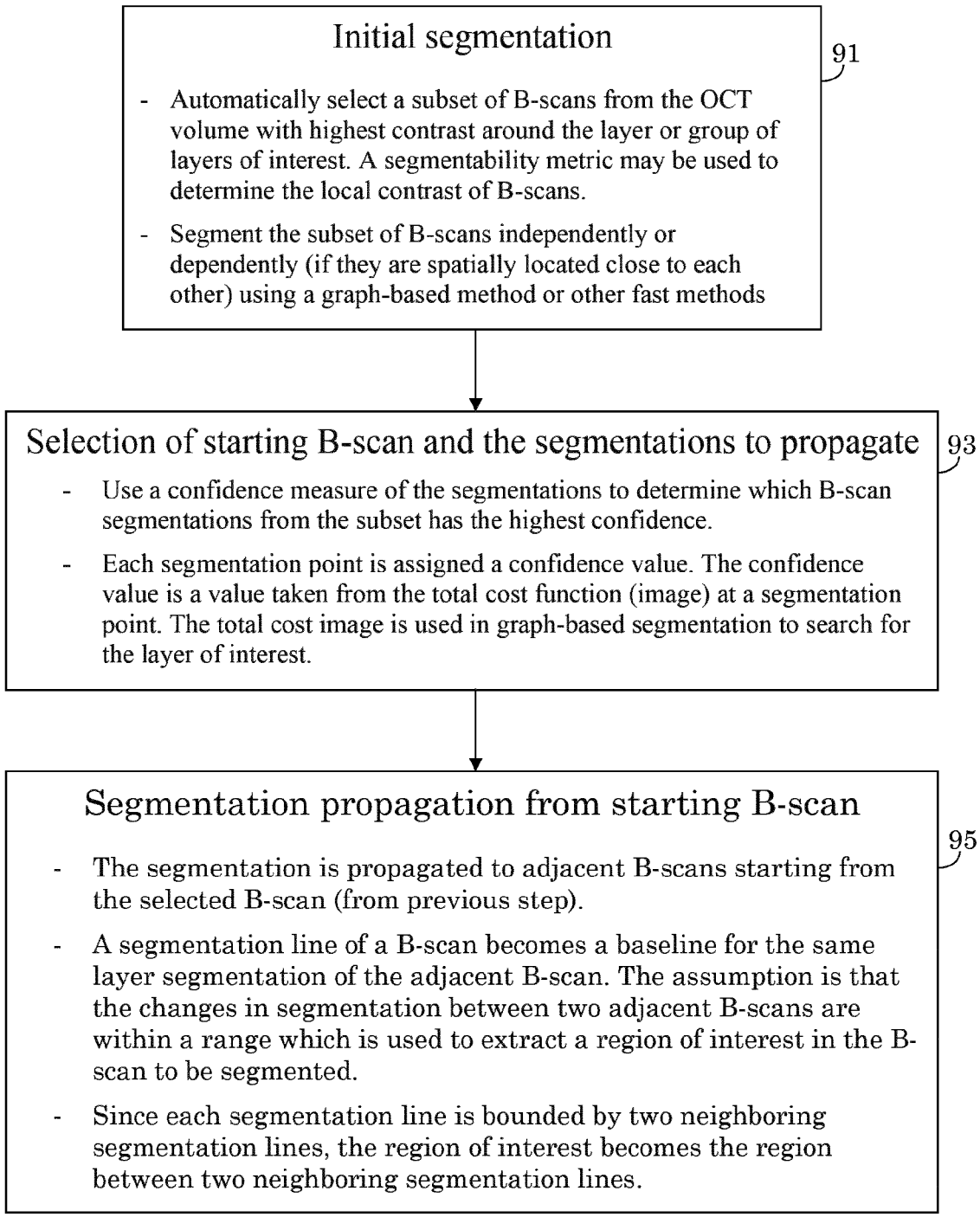
FIG. 16 illustrates a general process for an automatic method based on segmentation propagation in accord with the present invention.

FIG. 16 illustrates a general process for an automatic method based on segmentation propagation in accord with the present invention. First, an initial segmentation is implemented in step 91. Within this step, a subset of B-scans from the OCT volume with highest contrast around the layer or group of layers of interest is automatically selected. A segmentability metric, such as described in U.S. Pat. No. 9,778,021 (assigned to the same assignee as the present invention) may be used to determine the local contrast of B-scans. The subset of B-scans may be segmented independently or dependently (if they are spatially located close to each other) using a graph-based method or other fast methods known in the art. In step 93, the starting B-scan is selected, as are the starting segmentation to be propagated. A confidence measure of the segmentations may be used to determine which B-scan segmentations from a subset of B-scans has the highest confidence. Preferably, each segmentation point is assigned a confidence value, which may be a value taken from the total cost function (image) at a segmentation point. The total cost image may also be used in graph-based segmentation to search for a layer of interest. In the third step 95, segmentation is propagated starting from B-scan selected in the previous step. The segmentation is propagated to adjacent B-scans starting from. In this process, A segmentation line of a B-scan becomes a baseline for the same layer segmentation of the adjacent B-scan. The assumption is that the changes in segmentation between two adjacent B-scans are defined (e.g., restricted to be) within a (predefined) range, which is used to extract a region of interest in the B-scan to be segmented (e.g., the segmentation is assumed to be limited to within this region of interest). For example, the range may be about one to five times the spacing between two adjacent B-scan. For instance, the for a spacing of 12 microns between two adjacent B-scans, the range may be between 10 to 30 microns). Alternatively, since each segmentation line is bounded by two neighboring segmentation lines, the range (e.g., region of interest) may be the region between two neighboring segmentation lines. For example, a first B-scan_1 is may be segmented, followed by a second B-scan_2 that uses the segmentations of B-scan 1 as the reference to define an OCT region of interest for a layer segmentation. Once B-scan 2 is segmented, it becomes the reference for a third B-scan 3.

Figure 17:
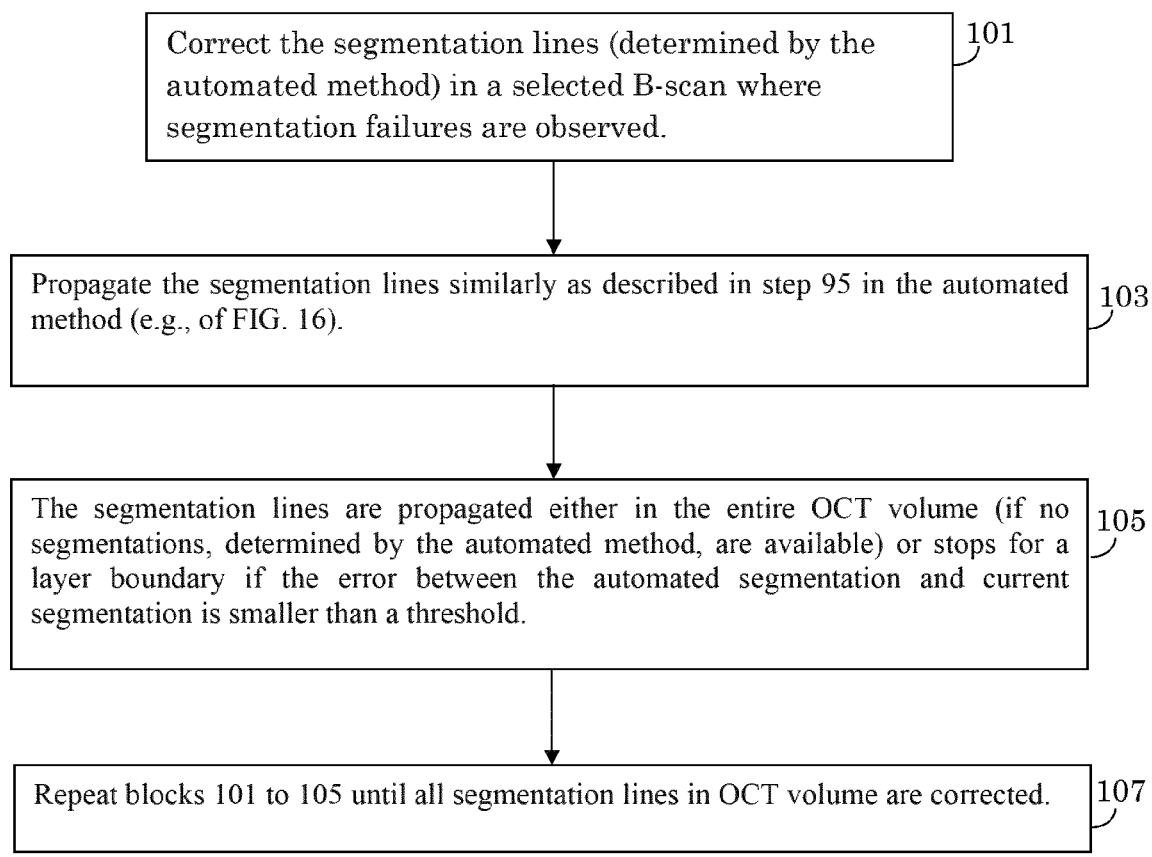
FIG. 17 shows a semi-automate method based on segmentation propagation.

FIG. 17 shows a semi-automate method based on segmentation propagation. Semi-automated segmentation and propagation for a layer boundary or a group of layer boundaries would replace steps 91 and 93 in the automated method of FIG. 16, with human expert inputs. In block 101, the segmentation lines (determined, for example, by the automated method) are corrected in a selected B-scan where segmentation failures are observed. In block 103, segmentation lines are propagated in a manner similar that of step 95 in the automated method of FIG. 16. As indicated in block 105, the segmentation lines are propagated either in the entire OCT volume (if no segmentations, determined by the automated method, are available) or stops for a layer boundary if the error between the automated segmentation and current segmentation is smaller than a threshold (e.g., a threshold of five microns). Blocks 101 to 105 are then repeated until all segmentation lines in OCT volume are corrected, as indicated by block 107.

Hereinafter is provided a description of various hardware and architectures suitable for the present invention.

Optical Coherence Tomography Imaging System

Generally, optical coherence tomography (OCT) uses low-coherence light to produce two-dimensional (2D) and three-dimensional (3D) internal views of biological tissue. OCT enables in vivo imaging of retinal structures. OCT angiography (OCTA) produces flow information, such as vascular flow from within the retina. Examples of OCT systems are provided in U.S. Pat. Nos. 6,741,359 and 9,706,915, and examples of an OCTA systems may be found in U.S. Pat. Nos. 9,700,206 and 9,759,544, all of which are herein incorporated in their entirety by reference. An exemplary OCT/OCTA system is provided herein.

Figure 18:
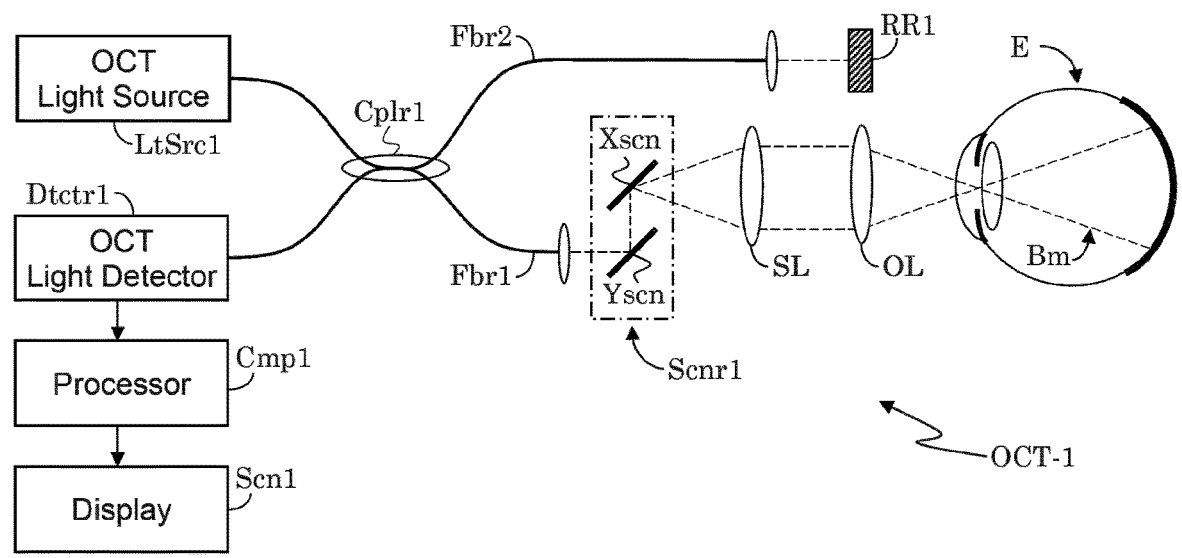
FIG. 18 illustrates a generalized frequency domain optical coherence tomography system used to collect 3D image data of the eye suitable for use with the present invention.

FIG. 18 illustrates a generalized frequency domain optical coherence tomography (FD-OCT) system used to collect 3D image data of the eye suitable for use with the present invention. An FD-OCT system OCT_1 includes a light source, LtSrc1. Typical light sources include, but are not limited to, broadband light sources with short temporal coherence lengths or swept laser sources. A beam of light from light source LtSrc1 is routed, typically by optical fiber Fbr1, to illuminate a sample, e.g., eye E; a typical sample being tissues in the human eye. The light source LrSrc1 may, for example, be a broadband light source with short temporal coherence length in the case of spectral domain OCT (SD-OCT) or a wavelength tunable laser source in the case of swept source OCT (SS-OCT). The light may be scanned, typically with a scanner Scnr1 between the output of the optical fiber Fbr1 and the sample E, so that the beam of light (dashed line Bm) is scanned laterally over the region of the sample to be imaged. The light beam from scanner Scnr1 may pass through a scan lens SL and an ophthalmic lens OL and be focused onto the sample E being imaged. The scan lens SL may receive the beam of light from the scanner Scnr1 at multiple incident angles and produces substantially collimated light, ophthalmic lens OL may then focus onto the sample. The present example illustrates a scan beam that needs to be scanned in two lateral directions (e.g., in x and y directions on a Cartesian plane) to scan a desired field of view (FOV). An example of this would be a point-field OCT, which uses a point-field beam to scan across a sample. Consequently, scanner Scnr1 is illustratively shown to include two sub-scanner: a first sub-scanner Xscn for scanning the point-field beam across the sample in a first direction (e.g., a horizontal x-direction); and a second sub-scanner Yscn for scanning the point-field beam on the sample in traversing second direction (e.g., a vertical y-direction). If the scan beam were a line-field beam (e.g., a line-field OCT), which may sample an entire line-portion of the sample at a time, then only one scanner may be needed to scan the line-field beam across the sample to span the desired FOV. If the scan beam were a full-field beam (e.g., a full-field OCT), no scanner may be needed, and the full-field light beam may be applied across the entire, desired FOV at once.

Figure 22:
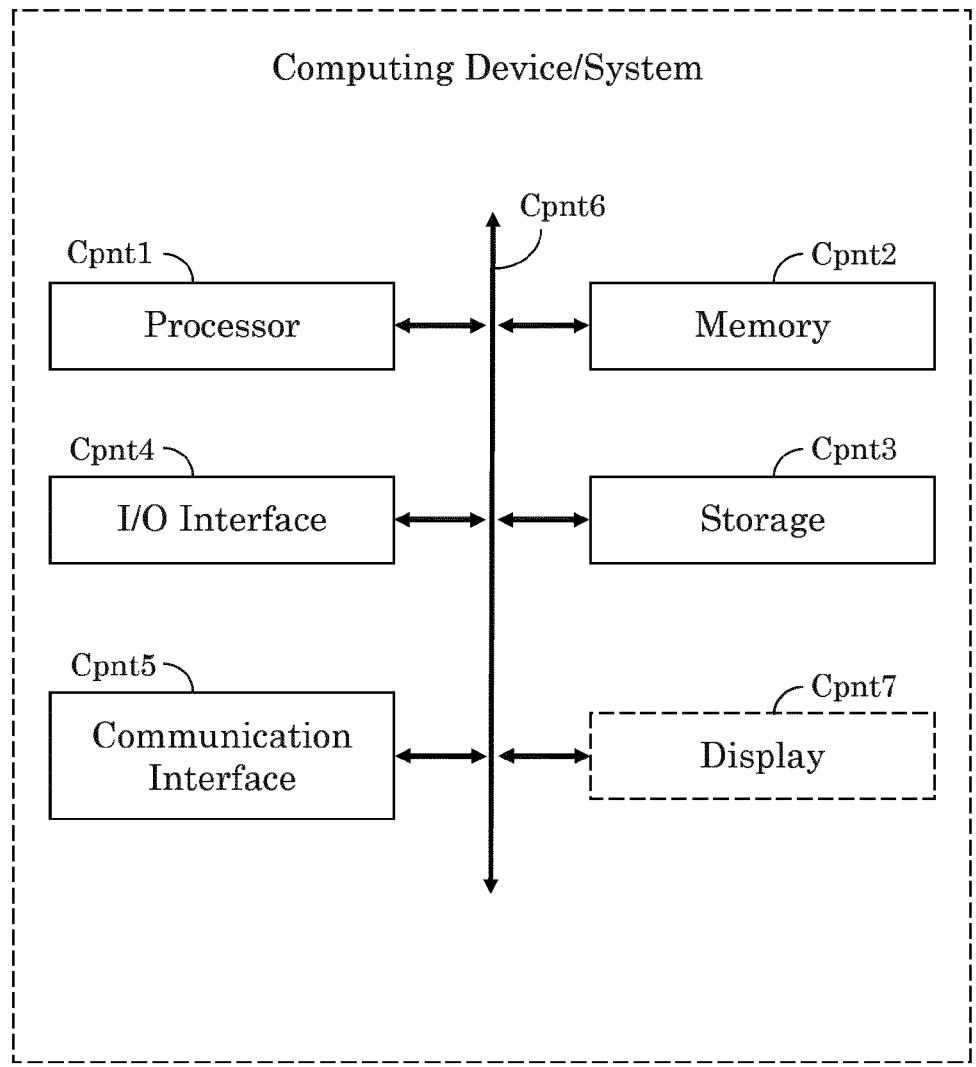
FIG. 22 illustrates an example computer system (or computing device or computer).

Irrespective of the type of beam used, light scattered from the sample (e.g., sample light) is collected. In the present example, scattered light returning from the sample is collected into the same optical fiber Fbr1 used to route the light for illumination. Reference light derived from the same light source LtSrc1 travels a separate path, in this case involving optical fiber Fbr2 and retro-reflector RR1 with an adjustable optical delay. Those skilled in the art will recognize that a transmissive reference path can also be used and that the adjustable delay could be placed in the sample or reference arm of the interferometer. Collected sample light is combined with reference light, for example, in a fiber coupler Cplr1, to form light interference in an OCT light detector Dtctr1 (e.g., photodetector array, digital camera, etc.). Although a single fiber port is shown going to the detector Dtctr1, those skilled in the art will recognize that various designs of interferometers can be used for balanced or unbalanced detection of the interference signal. The output from the detector Dtctr1 is supplied to a processor (e.g., internal or external computing device) Cmp1 that converts the observed interference into depth information of the sample. The depth information may be stored in a memory associated with the processor Cmp1 and/or displayed on a display (e.g., computer/electronic display/screen) Scn1. The processing and storing functions may be localized within the OCT instrument, or functions may be offloaded onto (e.g., performed on) an external processor (e.g., an external computing device), to which the collected data may be transferred. An example of a computing device (or computer system) is shown in FIG. 22. This unit could be dedicated to data processing or perform other tasks which are quite general and not dedicated to the OCT device. The processor (computing device) Cmp1 may include, for example, a field-programmable gate array (FPGA), a digital signal processor (DSP), an application specific integrated circuit (ASIC), a graphics processing unit (GPU), a system on chip (SoC), a central processing unit (CPU), a general purpose graphics processing unit (GPGPU), or a combination thereof, that may performs some, or the entire, processing steps in a serial and/or parallelized fashion with one or more host processors and/or one or more external computing devices.

The sample and reference arms in the interferometer could consist of bulkoptics, fiber-optics, or hybrid bulk-optic systems and could have different architectures such as Michelson, Mach-Zehnder or common-path based designs as would be known by those skilled in the art. Light beam as used herein should be interpreted as any carefully directed light path. Instead of mechanically scanning the beam, a field of light can illuminate a one or two-dimensional area of the retina to generate the OCT data (see for example, U.S. Pat. No. 9,332,902; D. Hillmann et al, "Holoscopy—Holographic Optical Coherence Tomography," *Optics Letters*, 36(13): 2390 2011; Y. Nakamura, et al, "High-Speed Three Dimensional Human Retinal Imaging by Line Field Spectral Domain Optical Coherence Tomography," *Optics Express*, 15(12):7103 2007; Blazkiewicz et al, "Signal-To-Noise Ratio Study of Full-Field Fourier-Domain Optical Coherence Tomography," *Applied Optics*, 44(36):7722 (2005)). In time-domain systems, the reference arm needs to have a tunable optical delay to generate interference. Balanced detection systems are typically used in TD-OCT and SS-OCT systems, while spectrometers are used at the detection port for SD-OCT systems. The invention described herein could be applied to any type of OCT system. Various aspects of the invention could apply to any type of OCT system or other types of ophthalmic diagnostic systems and/or multiple ophthalmic diagnostic systems including but not limited to fundus imaging systems, visual field test devices, and scanning laser polarimeters.

In Fourier Domain optical coherence tomography (FD-OCT), each measurement is the real-valued spectral interferogram (Sj(k)). The real-valued spectral data typically goes through several post-processing steps including background subtraction, dispersion correction, etc. The Fourier transform of the processed interferogram, results in a complex valued OCT signal output $Aj(z)=|Aj|ei\varphi$. The absolute value of this complex OCT signal, $|Aj|$, reveals the profile of scattering intensities at different path lengths, and therefore scattering as a function of depth (z-direction) in the sample. Similarly, the phase, $\varphi j$ can also be extracted from the complex valued OCT signal. The profile of scattering as a function of depth is called an axial scan (A-scan). A set of A-scans measured at neighboring locations in the sample produces a cross-sectional image (tomogram or B-scan) of the sample. A collection of B-scans collected at different transverse locations on the sample makes up a data volume or cube. For a particular volume of data, the term fast axis refers to the scan direction along a single B-scan whereas slow axis refers to the axis along which multiple B-scans are collected. The term "cluster scan" may refer to a single unit or block of data generated by repeated acquisitions at the same (or substantially the same) location (or region) for the purposes of analyzing motion contrast, which may be used to identify blood flow. A cluster scan can consist of multiple A-scans or B-scans collected with relatively short time separations at approximately the same location(s) on the sample. Since the scans in a cluster scan are of the same region, static structures remain relatively unchanged from scan to scan within the cluster scan, whereas motion contrast between the scans that meets predefined criteria may be identified as blood flow.

A variety of ways to create B-scans are known in the art including but not limited to: along the horizontal or x-direction, along the vertical or y-direction, along the diagonal of x and y, or in a circular or spiral pattern. B-scans may be in the x-z dimensions but may be any cross-sectional image that includes the z-dimension. An example OCT B-scan image of a normal retina of a human eye is illustrated in FIG. 19. An OCT B-scan of the retinal provides a view of the structure of retinal tissue. For illustration purposes, FIG. 19 identifies various canonical retinal layers and layer boundaries. The identified retinal boundary layers include (from top to bottom): the inner limiting membrane (ILM) Lyer1, the retinal nerve fiber layer (RNFL or NFL) Layr2, the ganglion cell layer (GCL) Layr3, the inner plexiform layer (IPL) Layr4, the inner nuclear layer (INL) Layr5, the outer plexiform layer (OPL) Layr6, the outer nuclear layer (ONL) Layr7, the junction between the outer segments (OS) and inner segments (IS) (indicated by reference character Layr8) of the photoreceptors, the external or outer limiting membrane (ELM or OLM) Layr9, the retinal pigment epithelium (RPE) Layr10, and the Bruch's membrane (BM) Layr11.

In OCT Angiography, or Functional OCT, analysis algorithms may be applied to OCT data collected at the same, or approximately the same, sample locations on a sample at different times (e.g., a cluster scan) to analyze motion or flow (see for example US Patent Publication Nos. 2005/0171438, 2012/0307014, 2010/0027857, 2012/0277579 and U.S. Pat. No. 6,549,801, all of which are herein incorporated in their entirety by reference). An OCT system may use any one of a number of OCT angiography processing algorithms (e.g., motion contrast algorithms) to identify blood flow. For example, motion contrast algorithms can be applied to the intensity information derived from the image data (intensity-based algorithm), the phase information from the image data (phase-based algorithm), or the complex image data (complex-based algorithm). An en face image is a 2D projection of 3D OCT data (e.g., by averaging the intensity of each individual A-scan, such that each A-scan defines a pixel in the 2D projection). Similarly, an en face vasculature image is an image displaying motion contrast signal in which the data dimension corresponding to depth (e.g., z-direction along an A-scan) is displayed as a single representative value (e.g., a pixel in a 2D projection image), typically by summing or integrating all or an isolated portion of the data (see for example U.S. Pat. No. 7,301,644 herein incorporated in its entirety by reference). OCT systems that provide an angiography imaging functionality may be termed OCT angiography (OCTA) systems.

Figure 20:
FIG. 20 shows an example of an en face vasculature image.
Figure 21:
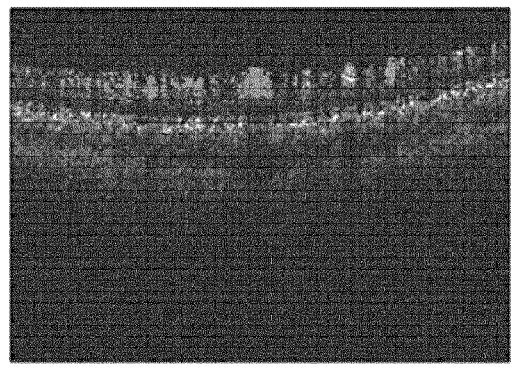
FIG. 21 shows an exemplary B-scan of a vasculature (OCTA) image.

FIG. 20 shows an example of an en face vasculature image. After processing the data to highlight motion contrast using any of the motion contrast techniques known in the art, a range of pixels corresponding to a given tissue depth from the surface of internal limiting membrane (ILM) in retina, may be summed to generate the en face (e.g., frontal view) image of the vasculature. FIG. 21 shows an exemplary B-scan of a vasculature (OCTA) image. As illustrated, structural information may not be well-defined since blood flow may traverse multiple retinal layers making them less defined than in a structural OCT B-scan, as shown in FIG. 19. Nonetheless, OCTA provides a non-invasive technique for imaging the microvasculature of the retina and the choroid, which may be critical to diagnosing and/or monitoring various pathologies. For example, OCTA may be used to identify diabetic retinopathy by identifying microaneurysms, neovascular complexes, and quantifying foveal avascular zone and nonperfused areas. Moreover, OCTA has been shown to be in good agreement with fluorescein angiography (FA), a more traditional, but more evasive, technique requiring the injection of a dye to observe vascular flow in the retina. Additionally, in dry age-related macular degeneration, OCTA has been used to monitor a general decrease in choriocapillaris flow. Similarly in wet age-related macular degeneration, OCTA can provides a qualitative and quantitative analysis of choroidal neovascular membranes. OCTA has also been used to study vascular occlusions, e.g., evaluation of nonperfused areas and the integrity of superficial and deep plexus.

Computing Device/System

FIG. 22 illustrates an example computer system (or computing device or computer device). In some embodiments, one or more computer systems may provide the functionality described or illustrated herein and/or perform one or more steps of one or more methods described or illustrated herein. The computer system may take any suitable physical form. For example, the computer system may be an embedded computer system, a system-on-chip (SOC), a single-board computer system (SBC) (such as, for example, a computer-on-module (COM) or system-on-module (SOM)), a desktop computer system, a laptop or notebook computer system, a mesh of computer systems, a mobile telephone, a personal digital assistant (PDA), a server, a tablet computer system, an augmented/virtual reality device, or a combination of two or more of these. Where appropriate, the computer system may reside in a cloud, which may include one or more cloud components in one or more networks.

In some embodiments, the computer system may include a processor Cpnt1, memory Cpnt2, storage Cpnt3, an input/output (I/O) interface Cpnt4, a communication interface Cpnt5, and a bus Cpnt6. The computer system may optionally also include a display Cpnt7, such as a computer monitor or screen.

Processor Cpnt1 includes hardware for executing instructions, such as those making up a computer program. For example, processor Cpnt1 may be a central processing unit (CPU) or a general-purpose computing on graphics processing unit (GPGPU). Processor Cpnt1 may retrieve (or fetch) the instructions from an internal register, an internal cache, memory Cpnt2, or storage Cpnt3, decode and execute the instructions, and write one or more results to an internal register, an internal cache, memory Cpnt2, or storage Cpnt3. In particular embodiments, processor Cpnt1 may include one or more internal caches for data, instructions, or addresses. Processor Cpnt1 may include one or more instruction caches, one or more data caches, such as to hold data tables. Instructions in the instruction caches may be copies of instructions in memory Cpnt2 or storage Cpnt3, and the instruction caches may speed up retrieval of those instructions by processor Cpnt1. Processor Cpnt1 may include any suitable number of internal registers, and may include one or more arithmetic logic units (ALUs). Processor Cpnt1 may be a multi-core processor; or include one or more processors Cpnt1. Although this disclosure describes and illustrates a particular processor, this disclosure contemplates any suitable processor.

Memory Cpnt2 may include main memory for storing instructions for processor Cpnt1 to execute or to hold interim data during processing. For example, the computer system may load instructions or data (e.g., data tables) from storage Cpnt3 or from another source (such as another computer system) to memory Cpnt2. Processor Cpnt1 may load the instructions and data from memory Cpnt2 to one or more internal register or internal cache. To execute the instructions, processor Cpnt1 may retrieve and decode the instructions from the internal register or internal cache.

During or after execution of the instructions, processor Cpnt1 may write one or more results (which may be intermediate or final results) to the internal register, internal cache, memory Cpnt2 or storage Cpnt3. Bus Cpnt6 may include one or more memory buses (which may each include an address bus and a data bus) and may couple processor Cpnt1 to memory Cpnt2 and/or storage Cpnt3. Optionally, one or more memory management unit (MMU) facilitate data transfers between processor Cpnt1 and memory Cpnt2. Memory Cpnt2 (which may be fast, volatile memory) may include random access memory (RAM), such as dynamic RAM (DRAM) or static RAM (SRAM). Storage Cpnt3 may include long-term or mass storage for data or instructions. Storage Cpnt3 may be internal or external to the computer system, and include one or more of a disk drive (e.g., hard-disk drive, HDD, or solid-state drive, SSD), flash memory, ROM, EPROM, optical disc, magneto-optical disc, magnetic tape, Universal Serial Bus (USB)-accessible drive, or other type of non-volatile memory.

I/O interface Cpnt4 may be software, hardware, or a combination of both, and include one or more interfaces (e.g., serial or parallel communication ports) for communication with I/O devices, which may enable communication with a person (e.g., user). For example, I/O devices may include a keyboard, keypad, microphone, monitor, mouse, printer, scanner, speaker, still camera, stylus, tablet, touch screen, trackball, video camera, another suitable I/O device, or a combination of two or more of these.

Communication interface Cpnt5 may provide network interfaces for communication with other systems or networks. Communication interface Cpnt5 may include a Bluetooth interface or other type of packet-based communication. For example, communication interface Cpnt5 may include a network interface controller (NIC) and/or a wireless NIC or a wireless adapter for communicating with a wireless network. Communication interface Cpnt5 may provide communication with a WI-FI network, an ad hoc network, a personal area network (PAN), a wireless PAN (e.g., a Bluetooth WPAN), a local area network (LAN), a wide area network (WAN), a metropolitan area network (MAN), a cellular telephone network (such as, for example, a Global System for Mobile Communications (GSM) network), the Internet, or a combination of two or more of these.

Bus Cpnt6 may provide a communication link between the above-mentioned components of the computing system. For example, bus Cpnt6 may include an Accelerated Graphics Port (AGP) or other graphics bus, an Enhanced Industry Standard Architecture (EISA) bus, a front-side bus (FSB), a HyperTransport (HT) interconnect, an Industry Standard Architecture (ISA) bus, an InfiniBand bus, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or other suitable bus or a combination of two or more of these.

Although this disclosure describes and illustrates a particular computer system having a particular number of particular components in a particular arrangement, this disclosure contemplates any suitable computer system having any suitable number of any suitable components in any suitable arrangement.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

The invention claimed is:

1. A method for segmenting a target retinal layer in an optical coherence tomography (OCT) image, said method comprising:
   collecting OCT data of an eye with an OCT system;
   determining motion contrast information from the OCT data using an OCT angiography (OCTA) processing technique to define OCTA data;
   enhancing the OCT data at the target retinal layer based on a combination of the OCT data and OCTA data;
   wherein enhancing the OCT data includes attenuating the OCT signal below the target retinal layer in the absence of any retinal layer segmentations; and
   segmenting at the target retinal layer based on the enhanced OCT data;
   storing or displaying the segmentation or a further analysis thereof.

2. The method of claim 1, wherein enhancing of the OCT data is based on a similarity measure of the OCT data and OCTA data.

3. The method of claim 2, wherein enhancing of the OCT data includes changing the contrast of the OCT data based on the similarity measure.

4. The method of claim 3, wherein the change in contrast is inversely proportional to the similarity measure.

5. The method of claim 2, wherein the similarity measure is based on a measure of the joint variability of the OCT data and OCTA data.

6. The method of claim 2, wherein the similarity measure is based on a measure of data spread of the OCT data and OCTA data.

7. The method of claim 1, wherein enhancing the OCT data includes subtracting a proportion of a mixture of the OCT data and OCTA data from the OCT data.

8. The method of claim 1, wherein the target retinal layer is at a boundary of the Bruch's membrane (BM).

9. The method of claim 1, further including segmenting the OCT image at the Bruch's membrane based on the segmentation of the enhanced OCT data.

10. The method of claim 1, wherein the target retinal layer is at choroidal-scleral interface.

11. The method of claim 1, wherein segmenting at the target retinal layer includes applying segmentation in multiple stages at different data resolutions, where the first stage applies segmentation at a lowest data resolution, and the output segmentation of each stage is a starting segmentation for the next stage.

12. A method for segmenting a target retinal layer in an optical coherence tomography (OCT) image, said method comprising:
   collecting OCT data of an eye with an OCT system;
   determining motion contrast information from the OCT data using an OCT angiography (OCTA) processing technique to define OCTA data;
   enhancing the OCT data at the target retinal layer based on a combination of the OCT data and OCTA data;
   wherein enhancing the OCT data includes subtracting a proportion of a mixture of the OCT data and OCTA data from the OCT data;
   wherein the proportion is based on a ratio of a measure of the joint variability of the OCT data and OCTA data to a measure of data spread of the OCT data and OCTA data; and
   segmenting at the target retinal layer based on the enhanced OCT data;
   storing or displaying the segmentation or a further analysis thereof.

13. A method for segmenting a target retinal layer in an optical coherence tomography (OCT) image, said method comprising:
   collecting OCT data of an eye with an OCT system;
   determining motion contrast information from the OCT data using an OCT angiography (OCTA) processing technique to define OCTA data;
   enhancing the OCT data at the target retinal layer based on a combination of the OCT data and OCTA data; and
   segmenting at the target retinal layer based on the enhanced OCT data;
   storing or displaying the segmentation or a further analysis thereof;
wherein:
   the OCT image is a structural OCT volume ($V_s$);
   the motion contrast information is a flow OCTA volume ($V_a$); and
   enhancing the OCT data at the target retina layer includes determining an enhancement parameter $\alpha$ defined as:

$$\frac{\text{Cov}(w_1 V_s + w_2 V_a, V_s)}{\text{Var}(w_1 V_s + w_2 V_a)}$$

where $w_1$ and $w_2$ are weights for the structural OCT volume and the flow OCTA volume, respectively.

14. The method of claim 13, wherein the enhanced OCT data $V_e$ is determined as:

$$V_e = V_s - \alpha(w_1 V_s + w_2 V_a).$$

15. A method for segmenting a target retinal layer in an optical coherence tomography (OCT) image, said method comprising:
   collecting OCT data of an eye with an OCT system;
   determining motion contrast information from the OCT data using an OCT angiography (OCTA) processing technique to define OCTA data;
   enhancing the OCT data at the target retinal layer based on a combination of the OCT data and OCTA data;
   creating a first en face image based on a first slab, wherein the target retinal layer location defines the bottom of the first slab;
   creating a second en face image based on a second slab, wherein the target retinal layer location is between the top layer and bottom layer of the second slab;
   designating as failed or successful the segmented target retinal layer based on a similarity measure of the first en face image and second en face image; and
   segmenting at the target retinal layer based on the enhanced OCT data;
   storing or displaying the segmentation or a further analysis thereof.

16. The method of claim 15, wherein the first and second slabs are of the OCT data or OCTA data.

17. The method of claim 15, wherein in response to the target retinal layer being designated as failed, the segmentation of target retinal layer is replaced, at least in part, by an approximation based on a weighted average of the top layer and bottom layer of the second slab.

18. A method for segmenting a target retinal layer in an optical coherence tomography (OCT) image, said method comprising:
   collecting OCT data of an eye with an OCT system;
   determining motion contrast information from the OCT data using an OCT angiography (OCTA) processing technique to define OCTA data;
   enhancing the OCT data at the target retinal layer based on a combination of the OCT data and OCTA data; and
   segmenting at the target retinal layer based on the enhanced OCT data;
   storing or displaying the segmentation or a further analysis thereof;
   wherein segmenting at the target retinal layer includes propagating the current segmentation from a current B-scan to adjacent B-scans, with the current segmentation being a baseline for the same layer segmentation of the adjacent B-scans.

19. The method of claim 18, wherein changes in segmentation between two adjacent B-scans are restricted to be within a predefined range.

20. A method for segmenting retinal layers in an optical coherence tomography (OCT) image, said method comprising:
   collecting OCT data of an eye with an OCT system;
   segmenting the OCT data into individual retinal layers;
   for a target retinal layer:
      creating a first en face image based on a first slab, wherein the target retinal layer location is towards the bottom of the first slab;
      creating a second en face image based on a second slab, wherein the target retinal layer location is between the top layer and bottom layer of the second slab; and
      designating as failed or successful the segmentation of the target retinal layer based on a similarity measure of the first en face image and second en face image.

21. The method of claim 20, wherein the first and second en face images are of slabs from the OCT data or from OCT angiography data generated using the OCT data.

22. A method for segmenting a target retinal layer in an optical coherence tomography (OCT) image, said method comprising:
   collecting OCT data of an eye with an OCT system;
   determining motion contrast information from the OCT data using an OCT angiography (OCTA) processing technique to define OCTA data;
   enhancing the OCT data at the target retinal layer based on a combination of the OCT data and OCTA data; and
   segmenting at the target retinal layer based on the enhanced OCT data;
   storing or displaying the segmentation or a further analysis thereof;

wherein the similarity measure is based on normalized cross correlation (NCC) between the en face images.

23. A method for segmenting a target retinal layer in an optical coherence tomography (OCT) image, said method comprising:
collecting OCT data of an eye with an OCT system;
determining motion contrast information from the OCT data using an OCT angiography (OCTA) processing technique to define OCTA data;
enhancing the OCT data at the target retinal layer based on a combination of the OCT data and OCTA data; and
segmenting at the target retinal layer based on the enhanced OCT data;
storing or displaying the segmentation or a further analysis thereof;
wherein in response to the segmentation being designated as failed, at least part of the segmentation is replaced with an approximation based on the top layer and bottom layer of the second slab.

24. The method of claim 23, wherein determination of the approximation includes applying weights to the top layer and bottom layers of the second slab based on their position relative to an expected position of the target retinal layer.

25. The method of claim 23, wherein the similarity measure includes local similarity measures that identify local segmentation failures, and the local segmentation failures are replaced with the approximation.

26. The method of claim 25, wherein the local similarity measures are determined on a B-scan by B-scan basis.

27. A method for segmenting a target retinal layer in an optical coherence tomography (OCT) image, said method comprising:
collecting OCT data of an eye with an OCT system;
determining motion contrast information from the OCT data using an OCT angiography (OCTA) processing technique to define OCTA data;
enhancing the OCT data at the target retinal layer based on a combination of the OCT data and OCTA data; and
segmenting at the target retinal layer based on the enhanced OCT data;
storing or displaying the segmentation or a further analysis thereof;
wherein the first and second slabs have the same top layer.

28. The method of claim 27, wherein the top and bottom layers of the second slab are selected based on a sharpness transition measure from bright to dark or dark to bright.

29. The method of claim 27, wherein the target retinal layer is the bottom layer of the first slab, and the bottom layer of the second slab is lower than the target retinal layer.

30. The method of claim 29, wherein the top layer is the Inner Limiting Membrane (ILM), the target retinal layer is the Inner Plexiform Layer (IPL), and the bottom layer of the second slab is the Outer Plexiform Layer (OPL).

31. The method of claim 29 wherein the top layer is the Inner Limiting Membrane (ILM), the target retinal layer is the Outer Plexiform Layer (OPL), and the bottom layer of the second slab is Junction between Outer Segments (OS) and Inner Segments (IS).

* * * * *